US012705359B2

(12) United States Patent
Yoon et al.

(10) Patent No.: US 12,705,359 B2
(45) Date of Patent: Aug. 11, 2026

(54) IDENTIFIER GENERATION SYSTEM FOR ELECTRONIC DEVICE AND METHOD OF OPERATING SAME

(71) Applicant: SAMSUNG ELECTRONICS CO., LTD., Suwon-si (KR)

(72) Inventors: Sungho Yoon, Suwon-si (KR); Hyunsoo Kwon, Suwon-si (KR); Younsung Chu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 18/772,876

(22) Filed: Jul. 15, 2024

(65) Prior Publication Data

US 2025/0117489 A1 Apr. 10, 2025

(30) Foreign Application Priority Data

Oct. 6, 2023 (KR) ........................ 10-2023-0133803

(51) Int. Cl.
*G06F 21/57* (2013.01)
*G06F 21/44* (2013.01)

(52) U.S. Cl.
CPC ............ *G06F 21/575* (2013.01); *G06F 21/44* (2013.01); *G06F 2221/034* (2013.01)

(58) Field of Classification Search
CPC ... H04L 9/0825; H04L 9/3247; H04L 9/3236; H04L 9/3278; G06F 21/33; G06F 21/44; G06F 21/575; G06F 2221/034
See application file for complete search history.

(56) References Cited

U.S. PATENT DOCUMENTS 10,484,185 B2 11/2019 Fu
10,902,126 B2 * 1/2021 Sutton .................. G06F 21/575
11,418,333 B2 * 8/2022 Grobelny ............. H04L 9/0869
(Continued)

FOREIGN PATENT DOCUMENTS

CN 109492352 A 3/2019
WO 2022/271554 A1 12/2022

OTHER PUBLICATIONS

"Trusted Platform Architecture Hardware Requirements for a Device Identifier Composition Engine"—Family 2.0, level 00 Revision 69, Dated Dec. 16, 2016; 11 pages (Year: 2016).*
(Continued)

*Primary Examiner* — Brian T Misiura
(74) *Attorney, Agent, or Firm* — Sughrue Mion, PLLC

(57) ABSTRACT

An identifier generation system includes a certification server that generates a certificate, and an electronic device that receives the certificate from the certification server. The electronic device includes a read-only memory (ROM) that applies a secret value and a 0-th layer identifier to a message authentication code to generate a unique identifier, a boot loader layer that generates asymmetric keys and generates an asymmetric key certificate corresponding to the asymmetric keys, and a firmware layer that stores the asymmetric key certificate and transmits and receives the asymmetric keys. The asymmetric keys generated by the boot loader layer include one or more unique asymmetric keys that are immutable when the electronic device is updated, and one or more variable asymmetric keys that vary when the electronic device is updated.

17 Claims, 15 Drawing Sheets

(56) References Cited

U.S. PATENT DOCUMENTS

| | | | | |
|---|---|---|---|---|
| 11,601,268 | B2 * | 3/2023 | Hershman | H04L 9/088 |
| 12,381,717 | B2 * | 8/2025 | Dover | H04L 9/0844 |
| 2020/0193065 | A1 | 6/2020 | Smith | |
| 2020/0313909 | A1 | 10/2020 | Mondello et al. | |
| 2020/0322134 | A1 * | 10/2020 | Duval | H04L 63/0823 |
| 2021/0176056 | A1 | 6/2021 | Cai | |
| 2022/0004627 | A1 | 1/2022 | Smith et al. | |
| 2022/0129390 | A1 * | 4/2022 | Shiner | G06F 12/1433 |
| 2024/0184929 | A1 * | 6/2024 | Orlando | G06F 21/602 |
| 2024/0249002 | A1 * | 7/2024 | Yoon | G06F 21/575 |
| 2025/0119304 | A1 * | 4/2025 | Park | H04L 9/3268 |

OTHER PUBLICATIONS

Jager et al., “DICE harder—A hardware implementation of the Device Identifier Composition Engine,” ARES 2020, Aug. 2020, total 8 pages.

* cited by examiner

Figure 2:
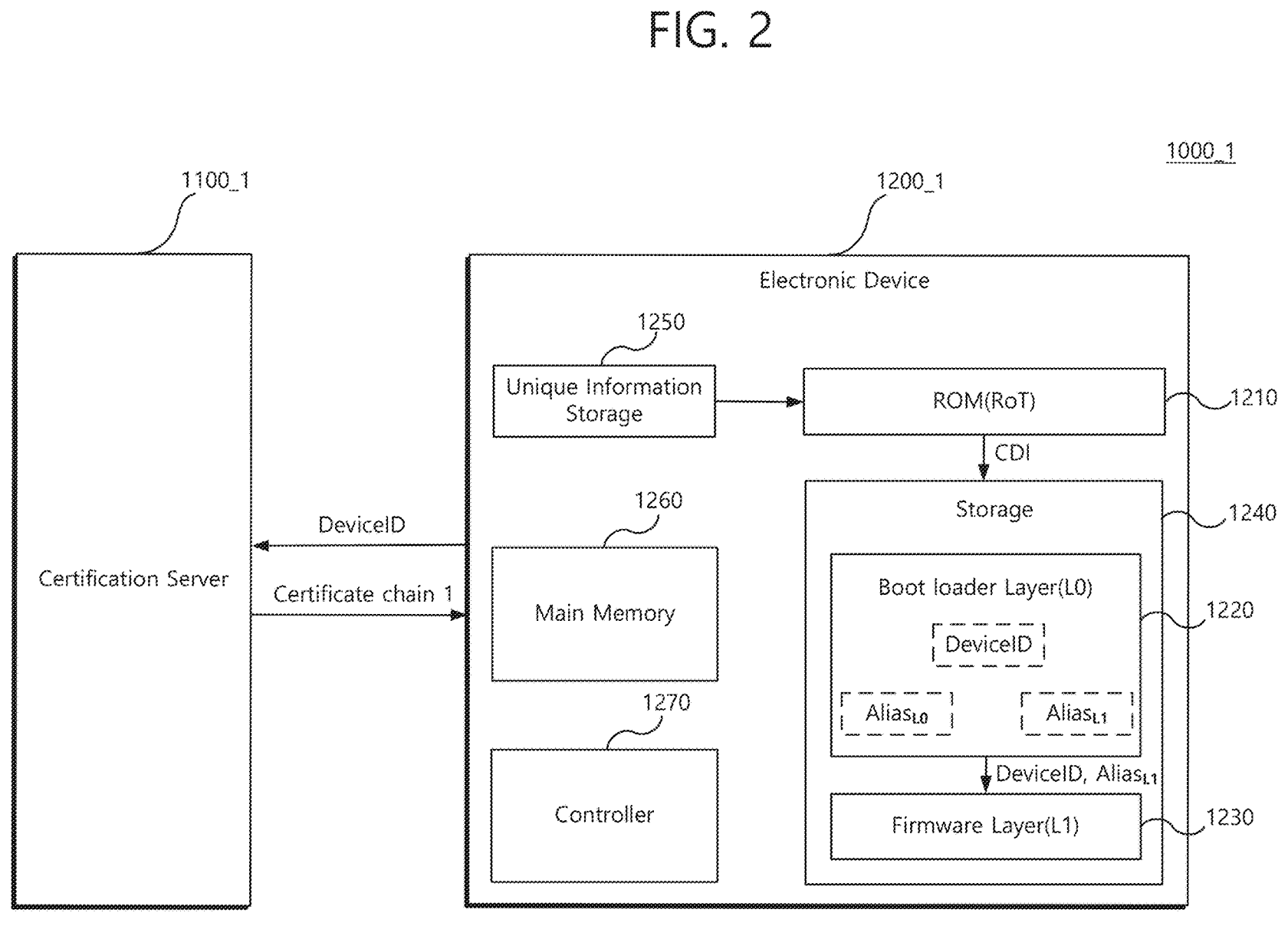

Electronic Device

1210

ROM(RoT)

CDI

1240

Storage

1220

Boot loader Layer(L0)

DeviceID $Alias_{L0}$ $Alias_{L1}$

DeviceID, $Alias_{L1}$

1230

Firmware Layer(L1)

1250

Unique Information Storage

1260

Main Memory

1270

Controller

DeviceID

Certificate chain 1

1100_1

Certification Server

IDENTIFIER GENERATION SYSTEM FOR ELECTRONIC DEVICE AND METHOD OF OPERATING SAME

CROSS-REFERENCE TO RELATED APPLICATIONS

This application claims priority under 35 U.S.C. § 119 to Korean Patent Application No. 10-2023-0133803 filed on Oct. 6, 2023, in the Korean Intellectual Property Office, the disclosure of which being incorporated by reference herein in its entirety.

BACKGROUND

Systems, methods, apparatuses, and devices consistent with the present disclosure relate to an identifier generation system for an electronic device for authentication and a method of operating the same.

Generally, when electronic devices perform a booting operation, a security solution for authentication may be applied. For example, upon booting an electronic device, the security solution may generate an identifier for the electronic device. The security solution may prevent a supply chain attack, which modulates a firmware of the electronic device based on the identifier during the production or distribution process.

SUMMARY

It is an aspect to provide an identifier generation system capable of improving the reliability of authority authentication, and a method of operating the same.

According to an aspect of one or more embodiments, there is provided an identifier generation system comprising a certification server configured to generate a certificate; and an electronic device configured to receive the certificate from the certification server. The electronic device includes a read-only memory (ROM) configured to apply a secret value and a 0-th layer identifier to a message authentication code to generate a unique identifier; a boot loader layer configured to generate a plurality of asymmetric keys and to generate an asymmetric key certificate corresponding to the plurality of asymmetric keys; and a firmware layer configured to store the asymmetric key certificate and to transmit and receive the plurality of asymmetric keys, wherein the plurality of asymmetric keys generated by the boot loader layer includes at least one unique asymmetric key that is immutable when the electronic device is updated; and at least one variable asymmetric key that varies when the electronic device is updated.

According to another aspect of one or more embodiments, there is provided an electronic device for generating an identifier, the electronic device comprising a ROM configured to apply a secret value and a 0-th layer identifier to a message authentication code to generate a unique identifier; a boot loader layer configured to generate a plurality of asymmetric keys and to generate an asymmetric key certificate corresponding to the plurality of asymmetric keys; and a firmware layer configured to store the asymmetric key certificate and to transmit and receive the plurality of asymmetric keys. The plurality of asymmetric keys generated by the boot loader layer includes at least one unique asymmetric key that is immutable when the electronic device is updated; and at least one variable asymmetric key that varies when the electronic device is updated.

According to yet another aspect of one or more embodiments, there is provided a method of generating an identifier, the method comprising generating a unique identifier by applying a secret value and a 0-th layer identifier to a message authentication code; generating a plurality of asymmetric keys based on the unique identifier; generating an asymmetric key certificate corresponding to the plurality of asymmetric keys; storing the asymmetric key certificate; and authenticating authority of the asymmetric key certificate. The plurality of asymmetric keys includes at least one unique asymmetric key that is immutable upon an update of an electronic device; and at least one variable asymmetric key that varies upon the update of the electronic device.

BRIEF DESCRIPTION OF THE FIGURES

The above and other aspects will become apparent by describing in detail embodiments thereof with reference to the accompanying drawings, in which:

FIG. 2 is a block diagram illustrating in more detail an example in which the identifier generation system of FIG. 1 is implemented in hardware, according to some embodiments;

FIG. 7 is a diagram illustrating an example of a boot loader layer of the electronic device of the identifier generation system of FIG. 1, according to some embodiments;

FIG. 13 is a flowchart illustrating an example of the boot loader layer of FIG. 12, according to some embodiments;

DETAILED DESCRIPTION

Hereinafter, various embodiments will be described clearly and in detail so that those skilled in the art can easily carry out the various embodiments.

Recently, a scheme using an asymmetric key as an identifier has been used in a security solution. In this case, an electronic device may generate a certificate based on an asymmetric key, and sign the certificate with the asymmetric key. Thereafter, authority authentication of a host terminal and an electronic device may be performed based on the signed certificate and asymmetric key. However, a new identifier must be generated when an electronic device is booted or the firmware is updated, and the asymmetric key must always be changed accordingly. Due to variable asymmetric keys, there is a disadvantage in that the reliability of authority authentication between the electronic device and the host terminal may be deteriorated. Therefore, there is a need to provide a security solution that does not change an asymmetric key and has improved confidentiality and integrity.

According to various embodiments, an identifier generation system for an electronic device may generate an identifier based on immutable unique information of the electronic device, and may encrypt and store the identifier. Accordingly, since the immutable unique information of the electronic device does not change, the reliability of authority authentication of the electronic device may be improved.

Figure 1:
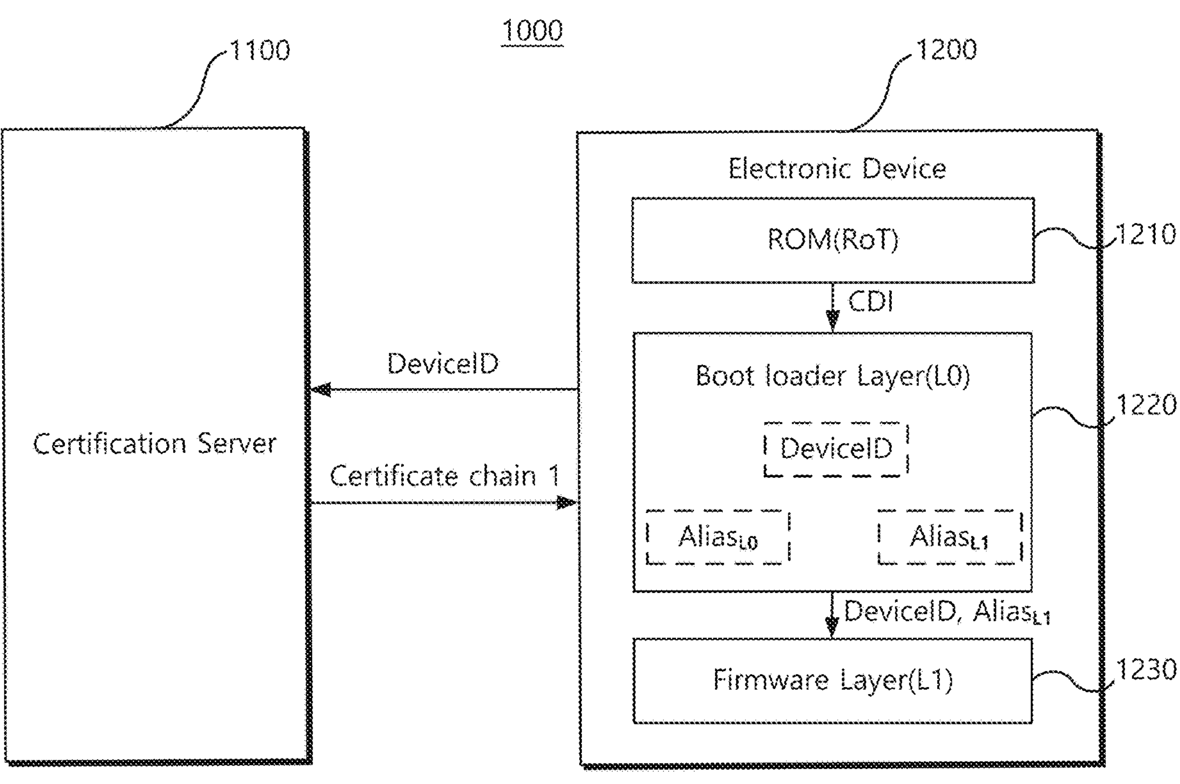
FIG. 1 is a block diagram illustrating an identifier generation system according to some embodiments.

FIG. 1 is a block diagram illustrating an identifier generation system 1000 according to some embodiments. The identifier generation system 1000 may include a certificate server 1100 and an electronic device 1200.

The identifier generation system 1000 may support an authority authentication solution for the electronic device 1200. In particular, the identifier generation system 1000 may generate a plurality of asymmetric keys that are identifiers of the electronic device 1200. In this case, at least one of the plurality of asymmetric keys may vary when a layer such as a boot loader or firmware is updated, and at least one of the plurality of asymmetric keys may be stored in at least one boot loader layer 1220 and may not vary when the layer is updated. In this case, because the plurality of asymmetric keys are generated based on unique information of the electronic device 1200, the plurality of asymmetric keys may be referred to as identifiers of the electronic device 1200.

The identifier generation system 1000 may improve the reliability of authority authentication by using an asymmetric key generated based on the unique information. For example, general electronic devices do not store asymmetric keys, but change the asymmetric key each time the electronic device is updated or booted. Accordingly, when a host terminal requests authority authentication of the electronic device 1200, the electronic device authenticates the host terminal by using a variable asymmetric key. In this case, because the variable asymmetric key is used, a verification error occurs during the authority verification process between the electronic device and the host terminal.

However, because the identifier generation system 1000 according to some embodiments uses the unique information of the electronic device 1200 that is immutable and uses an encrypted asymmetric key, the above-described verification error may be prevented, and thus the security of authority authentication of the host terminal may be further strengthened. At the same time, the identifier generation system 1000 may check changes in the layer (e.g., firmware update) through a plurality of variable asymmetric keys.

Referring to FIG. 1, as discussed above, the identifier generation system 1000 includes the certification server 1100 and the electronic device 1200.

The certification server 1100 may generate a certificate based on unique information of the electronic device 1200. For example, during manufacturing or mass production of the electronic device 1200, the certification server 1100 may generate the certificate based on the unique information of the electronic device 1200. A certificate DeviceID_Cert based on unique information may be referred to as, for example, a unique certificate, a unique information certificate, or a unique asymmetric key certificate.

In some embodiments, the unique information may be information injected from the outside during manufacturing of the electronic device 1200. For example, in some embodiments, the unique information may be information such as the semiconductor microstructure of the electronic device 1200. In some embodiments, the unique information may be information generated internally in the electronic device 1200. For example, in some embodiments, the unique information may be information generated during authority setting of the electronic device 1200. The unique information may be stored in a non-volatile memory of the electronic device 1200, as will be described with respect to FIG. 3 below.

The certification server 1100 may form a first certificate chain Certificate chain 1 including an unique asymmetric key certificate DeviceID_Cert to improve the reliability of the certificate. For example, the certification server 1100 may generate the unique asymmetric key certificate DeviceID_Cert and form the first certificate chain based on a signature on the unique asymmetric key certificate DeviceID_Cert. For example, the certification server 1100 may form a 3-layer certificate chain. However, this is an example, and embodiments are not limited thereto.

The certification server 1100 may inject the first certificate chain including the unique asymmetric key certificate DeviceID_Cert into the electronic device 1200.

The electronic device 1200 may be implemented to include a plurality of layers. For example, as shown in FIG. 1, the electronic device 1200 may include a read only memory (ROM) 1210, a boot loader layer 1220, and a firmware layer 1230. However, this is an example, and in some embodiments, the electronic device 1200 may be implemented to further include additional layers other than the ROM 1210, the boot loader layer 1220, and the firmware layer 1230.

In an embodiment, the ROM 1210, the boot loader layer 1220, and the firmware layer 1230 of the electronic device may be formed based on the device identifier composition engine (DICE) standard. For example, the ROM 1210, boot loader layer 1220, and firmware layer 1230 of the electronic device 1200 may correspond to a root of trust (ROT), a 0-th layer L0, and a first layer L1 according to the DICE standard, respectively.

The DICE standard, which is one of security solutions, is a cryptographic ID technology of the international security standards organization trusted computing group (TCG). The electronic device 1200 according to some embodiments may be implemented to comply with the DICE standard, and thus the authentication security of the electronic device 1200 may be strengthened.

In an embodiment, the electronic device 1200 according to the DICE standard may support device authentication and attestation technology for preventing firmware tampering of a storage device. For example, the electronic device 1200 may be implemented to generate a unique cryptographic identifier, which is unique information of the electronic device, and the unique cryptographic identifier may include an asymmetric key and a certificate. The electronic device 1200 may apply a change such as an update based on the asymmetric key and certificate, and may perform authority authentication of the host terminal based on the applied asymmetric key. In this case, it is assumed that the host terminal is a terminal device that receives and stores a signed certificate from the certification server 1100. In some embodiments, the certification server 1100 may be a manufacturer's server.

The ROM 1210 may generate a unique identifier CDI based on a secret value (e.g., a Unique Device Secret: UDS), which is unique information of the electronic device 1200. For example, the unique identifier CDI may be generated based on a hash value HashL0 of the boot loader layer 1220, which is the 0-th layer L0. That is, the boot loader layer 1220 may transmit the hash value HashL0 to the ROM 1210, and the ROM 1210 may generate the unique identifier CDI based on the hash value HashL0 (see FIG. 6). The ROM 1210 may transmit the unique identifier CDI to the boot loader layer 1220.

The boot loader layer 1220 may generate and store a plurality of asymmetric keys based on the unique identifier CDI received from the ROM 1210. The plurality of asymmetric keys may include at least one unique asymmetric key DeviceID and at least one variable asymmetric key. For example, as shown in the example illustrated in FIG. 1, in some embodiments, the boot loader layer 1220 may generate one unique asymmetric key DeviceID and two variable asymmetric keys. For example, the variable asymmetric keys may be denoted as a 0-th variable asymmetric key $Alias_{L0}$ and a first variable asymmetric key $Alias_{L1}$.

In some embodiments, when the electronic device 1200 is updated, the stored unique asymmetric key DeviceID may be immutable. In other words, when the electronic device 1200 is updated, the stored unique asymmetric key DeviceID may not change and thus may remain unchanged. To the contrary, when the electronic device 1200 is updated, the 0-th variable asymmetric key AliasL0 and the first variable asymmetric key AliasL1 may be variable and thus may be updated.

The boot loader layer 1220 may transmit the unique asymmetric key DeviceID to the firmware layer 1230. The firmware layer 1230 may transmit the unique asymmetric key DeviceID to the certification server 1100. The certification server 1100 may generate an unique asymmetric key certificate DeviceID_Cert corresponding to the unique asymmetric key DeviceID. For example, the unique asymmetric key certificate DeviceID_Cert may include unique information and the public key of the unique asymmetric key DeviceID.

The boot loader layer 1220 may generate a variable asymmetric key certificate corresponding to each of the plurality of variable asymmetric keys. The boot loader layer 1220 may transmit at least one variable asymmetric key and a variable asymmetric key certificate corresponding thereto to the firmware layer 1230. For example, the boot loader layer 1220 may transmit the first variable asymmetric key AliasL1 and the unique asymmetric key DeviceID to the firmware layer 1230. At the same time, the boot loader layer 1220 may transmit a plurality of certificates corresponding to the variable asymmetric key to the firmware layer 1230. For example, the boot loader layer 1220 may form a chain of the 0-th and first variable asymmetric key certificates through a signature. The boot loader layer 1220 may transmit the 0-th and first variable asymmetric key certificates constituting a chain to the firmware layer 1230.

The firmware layer 1230 may generate a second certificate chain based on the first certificate chain injected from the certification server 1100 and the variable asymmetric certificate received from the boot loader layer 1220. For example, the second certificate chain may include the unique asymmetric key certificate corresponding to the unique asymmetric key DeviceID, and the 0-th and first variable asymmetric key certificates corresponding to the 0-th and first variable asymmetric keys AliasL0 and AliasL1. The firmware layer 1230 may store the first certificate chain and store the 0-th and first variable asymmetric key certificates signed. Because the above-mentioned certificates are certificates in which a chain is formed through signatures, the certificates may be stored in the firmware layer 1230 to automatically form a second certificate chain.

When the host terminal requests authority authentication from the electronic device 1200, the firmware layer 1230 may verify the authority of the host terminal based on the stored second certificate chain. For example, the electronic device 1200 may verify the authority of the host terminal in response to a request from the host terminal. The firmware layer 1230 may verify the authority for the certificate of the host terminal based on the stored second certificate chain. The electronic device 1200 may determine whether the certificate transmitted by the host terminal matches the second certificate chain, and when matching, the electronic device 1200 may grant authority to the host terminal.

In related art electronic devices, all asymmetric keys used for verification may change due to update of the boot loader or firmware. That is, related art electronic devices do not have asymmetric keys that are immutable when the boot loader or firmware is updated. This configuration does not satisfy security standard protocols such as security protocols and data models (SPDM).

To the contrary, the identifier generation system 1000 according to some embodiments may generate a plurality of asymmetric keys, and the plurality of asymmetric keys may include the unique asymmetric key DeviceID that is immutable and at least one variable asymmetric key. Because the identifier generation system 1000 according to some embodiments includes at least one variable asymmetric key, the identifier generation system 1000 may check whether the boot loader or firmware has been updated. In addition, because the identifier generation system 1000 according to some embodiments includes the unique asymmetric key DeviceID that is immutable and thus does not change even when the boot loader or firmware is updated, the identifier generation system 1000 may satisfy security standard protocols such as SPDM, and provide the improved reliability of authority authentication.

FIG. 2 is a block diagram illustrating in more detail an example in which the identifier generation system of FIG. 1 is implemented in hardware, according to some embodiments. An identifier generation system 1000_1 of FIG. 2 is similar to the identifier generation system 1000 of FIG. 1. Accordingly, identical or similar components are denoted by identical or similar reference numerals, and overlapping descriptions will be omitted hereinafter for conciseness.

Referring to FIG. 2, an identifier generation system 1000_1 includes a certification server 1100_1 and an electronic device 1200_1. The electronic device 1200_1 may include the ROM 1210, the boot loader layer 1220, the firmware layer 1230, a storage 1240, a unique information storage 1250, a main memory 1260, and a controller 1270.

The unique information storage 1250 may store unique information about the electronic device 1200_1. The unique information stored in the unique information storage unit 1250 may be, for example, information about the semiconductor microstructure described with respect to FIG. 1. The unique information may be a value that is not disclosed to the outside, and accordingly, the unique information may be called a secret value UDS. For example, the unique information storage 1250 may be implemented as one time programmable (OTP) memory, mask ROM, PROM, EPROM, EEPROM, flash memory, and the like.

The ROM 1210 may store a ROM code. For example, the ROM code may generate the unique identifier CDI based on the secret value UDS that is unique information of the electronic device 1200_1.

The storage 1240 may store the boot loader layer 1220 and the firmware layer 1230. The storage 1240 may be implemented with a non-volatile memory. For example, the storage 1240 may be implemented with an EEPROM, a flash memory, a phase change random access memory (PRAM), a resistance random access memory (RRAM), a nano floating gate memory (NFGM), a polymer random access memory (PoRAM), and a magnetic random access memory (MRAM), a ferroelectric random access memory (FRAM), and/or a memory similar thereto.

The boot loader layer 1220 may generate the plurality of asymmetric keys based on the unique identifier CDI received from the ROM 1210. For example, the boot loader layer 1220 may generate the unique asymmetric key DeviceID, the 0-th variable asymmetric key AliasL0, and the first variable asymmetric key AliasL1. The boot loader layer 1220 may generate an asymmetric key certificate corresponding to each of the plurality of asymmetric keys. The boot loader layer 1220 may transmit the unique asymmetric key DeviceID, the first variable asymmetric key AliasL1 and the variable asymmetric key certificate to the firmware layer 1230.

The firmware layer 1230 may generate the second certificate chain based on the first certificate chain Certificate chain 1 received from the certification server 1100 and the variable asymmetric certificate received from the boot loader layer 1220. When the host terminal requests authority authentication from the electronic device 1200_1, the firmware layer 1230 may verify the authority of the host terminal based on the stored second certificate chain.

The main memory 1260, which is a volatile memory, may be provided as a working memory of the electronic device 1200_1. For example, the main memory 1260 may be implemented as a dynamic random access memory (DRAM), a static random access memory (SRAM), a mobile DRAM, and/or a similar memory. However, this is an example, and in some embodiments, the main memory 1260 may be implemented with a non-volatile memory.

The controller 1270 may include at least one processor and control the overall operation of the electronic device 1200_1.

As described with reference to FIG. 2, the identifier generation system 1000_1 according to some embodiments may generate the unique asymmetric key DeviceID, the 0-th variable asymmetric key AliasL0, and the first variable asymmetric key AliasL1. By using the 0-th variable asymmetric key AliasL0 and the first variable asymmetric key AliasL1, the identifier generation system 1000_1 may check whether the boot loader or firmware has been updated. By using the unique asymmetric key DeviceID, the identifier generation system 1000_1 may satisfy security standard protocols such as SPDM and provide improved reliability of authority authentication.

Figure 3:
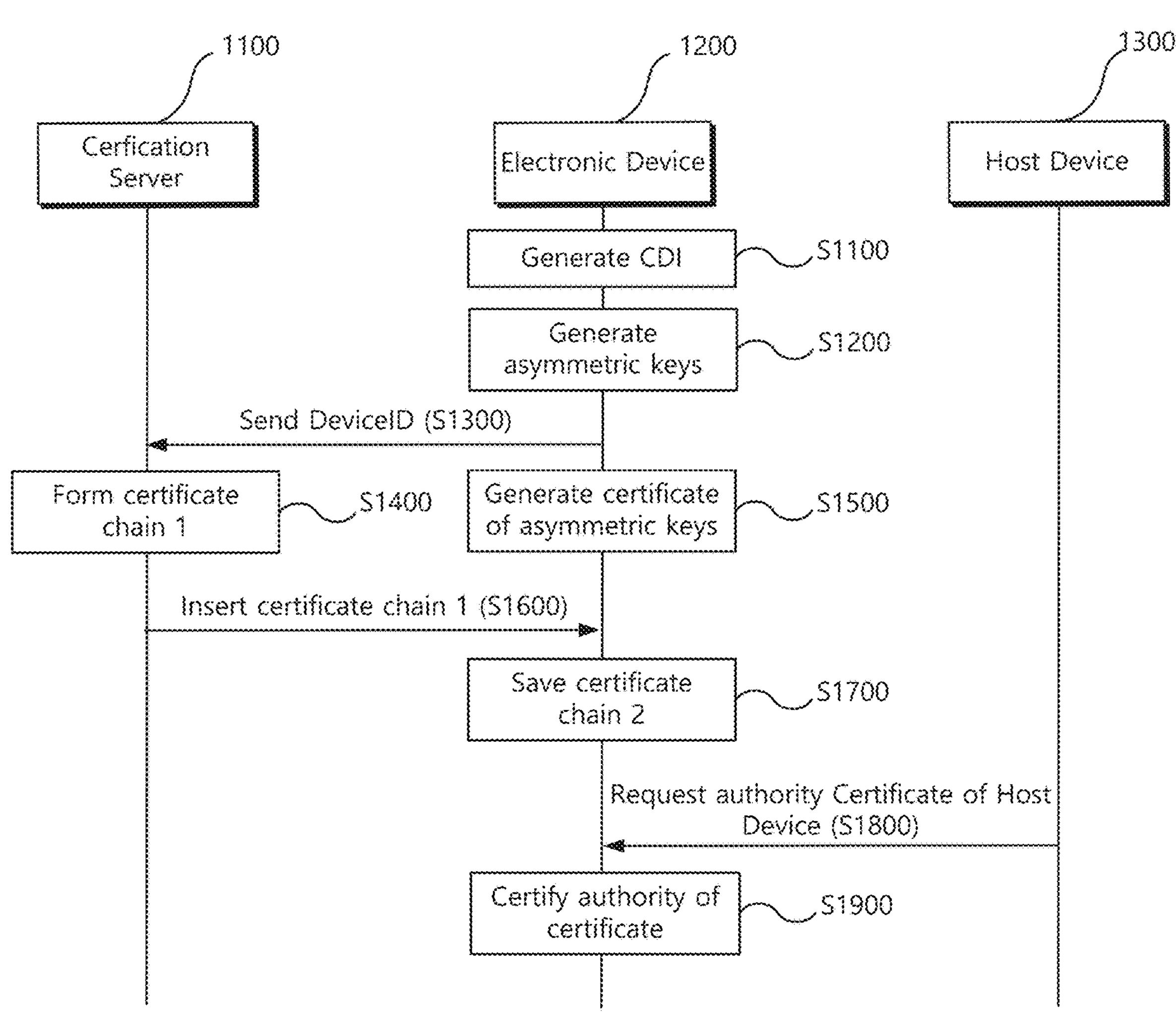
FIG. 3 is a flowchart illustrating an example of an operation of the identifier generation system of FIG. 1, according to some embodiments.

FIG. 3 is a flowchart illustrating an example of an operation of the identifier generation system 1000 of FIG. 1, according to some embodiments.

Referring to FIG. 3, in operation S1100, the unique identifier CDI may be generated. For example, the ROM 1210 of the electronic device 1200 may generate the unique identifier CDI based on the secret value UDS that is unique information of the electronic device 1200.

In operation S1200, the plurality of asymmetric keys may be generated based on the unique identifier CDI. For example, the boot loader layer 1220 may generate the plurality of asymmetric keys based on the unique identifier CDI. For example, the boot loader layer 1220 may generate the unique asymmetric key DeviceID, the 0-th variable asymmetric key AliasL0, and the first variable asymmetric key AliasL1.

In operation S1300, the unique asymmetric key DeviceID may be transmitted. For example, the firmware layer 1230 of the electronic device 1200 may transmit the unique asymmetric key DeviceID to the certification server 1100.

In operation S1400, the first certificate chain certification chain 1 may be formed. For example, the certification server 1100 may generate the unique asymmetric key certificate DeviceID_Cert, which is a certificate corresponding to the unique asymmetric key DeviceID. The certification server 1100 may form the first certificate chain including the unique asymmetric key certificate DeviceID_Cert. The unique asymmetric key certificate DeviceID_Cert may be a leaf certificate of the certificate chain.

In operation S1500, a variable asymmetric key certificate corresponding to the variable asymmetric key excluding the unique asymmetric key DeviceID may be generated. For example, the boot loader layer 1220 may generate a variable asymmetric key certificate corresponding to the variable asymmetric key excluding the unique asymmetric key DeviceID. For example, the boot loader layer 1220 may generate a variable asymmetric key certificate corresponding to each of the 0-th variable asymmetric key AliasL0 and the first variable asymmetric key AliasL1.

In operation S1600, the first certificate chain certificate chain 1 may be inserted into the electronic device 1200. For example, in some embodiments, the certification server 1100 may inject the first certificate chain certificate chain 1 including the unique asymmetric key certificate DeviceID_Cert into the electronic device 1200. In some embodiments, the certification server 1100 may inject the unique asymmetric key certificate DeviceID_Cert into the electronic device 1200.

In operation S1700, the second certificate chain certificate chain 2 may be stored. For example, the firmware layer 1230 may form and store the second certificate chain including the unique asymmetric key certificate DeviceID_Cert and the variable asymmetric key certificates together with the stored first certificate chain.

In operation S1800, an authority authentication request may be received based on a certificate of a host terminal 1300. For example, the host terminal 1300 may transmit an authorization request to the electronic device 1200 based on the stored certificate.

In operation S1900, the authority of the certificate may be verified. For example, the electronic device 1200 may verify the authority of the host terminal 1300 in response to the request from the host terminal 1300. The firmware layer 1230 may verify authority for the certificate of the host terminal 1300 based on the stored second certificate chain. The electronic device 1200 may determine whether the certificate transmitted by the host terminal 1300 matches the second certificate chain, and when matching, the electronic device 1200 may authorize the host terminal 1300.

As described above, the identifier generation system 1000 may generate a plurality of asymmetric keys, and the plurality of asymmetric keys may include the unique asymmetric key DeviceID and at least one variable asymmetric key. The stored unique asymmetric key DeviceID may not be changed even when the boot loader or firmware of the electronic device 1200 is updated. Accordingly, the identifier generation system 1000 according to some embodiments may provide further improved reliability of authority authentication.

Hereinafter, examples of each configuration and operation of the identifier generation system 1000 of FIG. 1 will be described in more detail with reference to the drawings.

Figure 4:
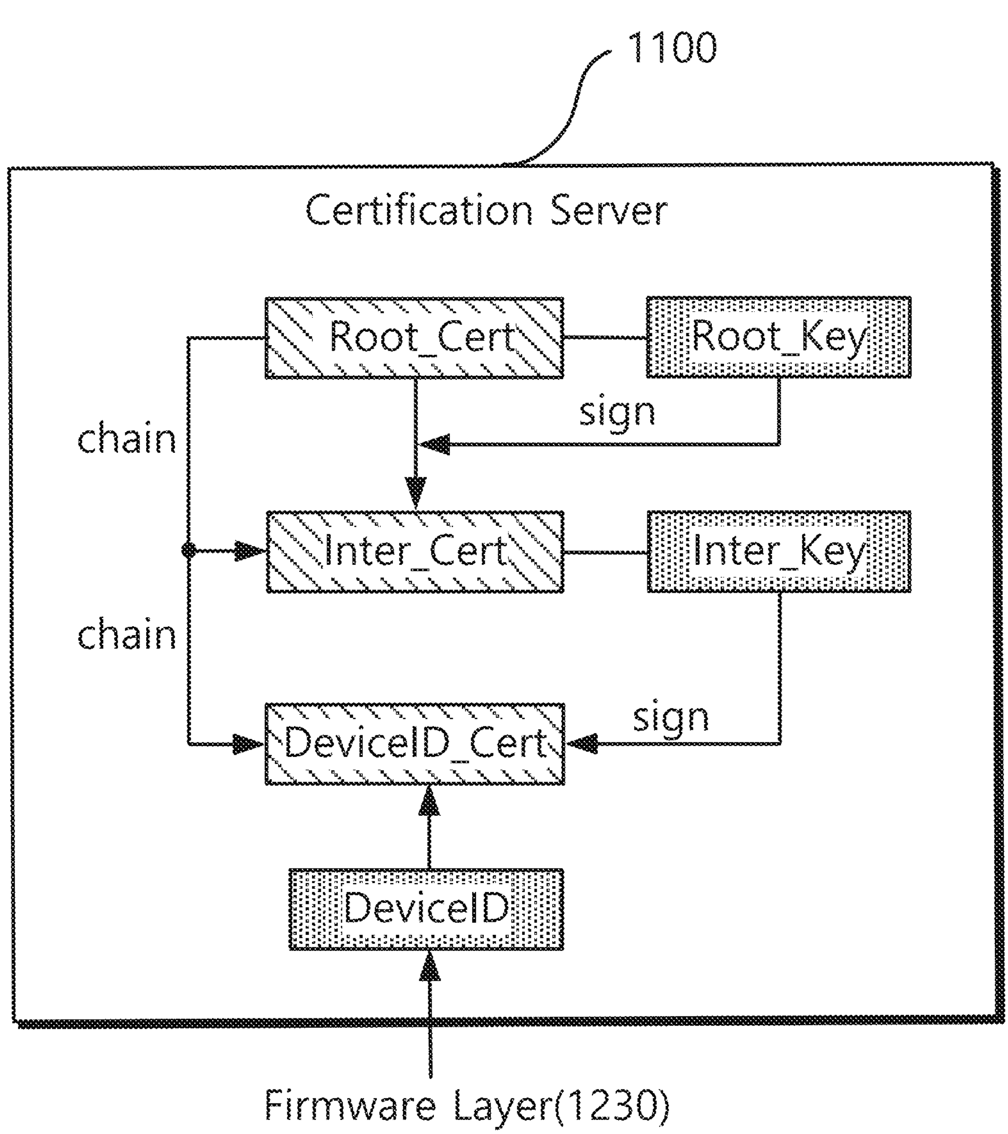
FIG. 4 is a diagram illustrating an example of the certification server of the identifier generation system of FIG. 1, according to some embodiments.

FIG. 4 is a diagram illustrating an example of the certification server 1100 of the identifier generation system 1000 of FIG. 1, according to some embodiments.

Referring to FIG. 4, the certification server 1100 may receive the unique asymmetric key DeviceID from the firmware layer 1230 of the electronic device 1200. The certification server 1100 may generate the unique asymmetric key certificate DeviceID_Cert based on the received unique asymmetric key DeviceID. In an embodiment, the asymmetric key certificate DeviceID_Cert may be generated based on the X.509 certificate standard. However, this is an example, and embodiments are not limited thereto.

The certification server 1100 may form a certificate chain to improve security reliability. For example, as shown in FIG. 4, the certification server 1100 may form a three-layer certificate chain including a root certificate Root_Cert, an intermediate certificate Inter_Cert, and the unique asymmetric key certificate DeviceID_Cert. In this case, the certificate chain may be formed based on a signature. The certificate chain of the certification server 1100 may be formed in a chain of trust (CoT) structure.

In more detail, the certification server 1100 may generate a root key Root_Key that verifies the root certificate Root_Cert and an intermediate key Inter_Key that verifies the intermediate certificate Inter_Cert. Each certificate may include a corresponding public key. For example, in some embodiments, the root certificate Root_Cert may be issued by the manufacturer of the electronic device 1200. In some embodiments, the intermediate certificate Inter_Cert may be issued at the manufacturer's workplace.

The certification server 1100 may sign the intermediate certificate Inter_Cert with the secret key of the root key Root_Key and may sign the unique asymmetric key certificate DeviceID_Cert with the secret key of the intermediate key Inter_Key. Through such a signing operation, the certification server 1100 may form a certificate chain. The certificate chain formed by the certification server 1100 may be referred to as a first certificate chain.

In FIG. 4, for convenience of explanation, the certification server 1100 is described as forming a three-layer first certificate chain, but embodiments are not limited thereto. In some embodiments, the certification server 1100 may form a first certificate chain of N layers (N is a natural number of 2 or more).

The certification server 1100 may transmit the first certificate chain including the unique asymmetric key certificate DeviceID_Cert to the electronic device 1200. The electronic device 1200 may verify the asymmetric key certificate DeviceID_Cert included in the received first certificate chain by using the unique asymmetric key DeviceID. For example, the electronic device 1200 may verify the first certificate chain by using the public key of the unique asymmetric key DeviceID. Through such a verification process, it may be determined whether the first certificate chain is injected into the electronic device 1200.

As described above, the certification server 1100 of the identifier generation system 1000 according to some embodiments may form the unique asymmetric key certificate DeviceID_Cert and the certificate chain including the unique asymmetric key certificate DeviceID_Cert based on the unique asymmetric key DeviceID.

Figure 5:
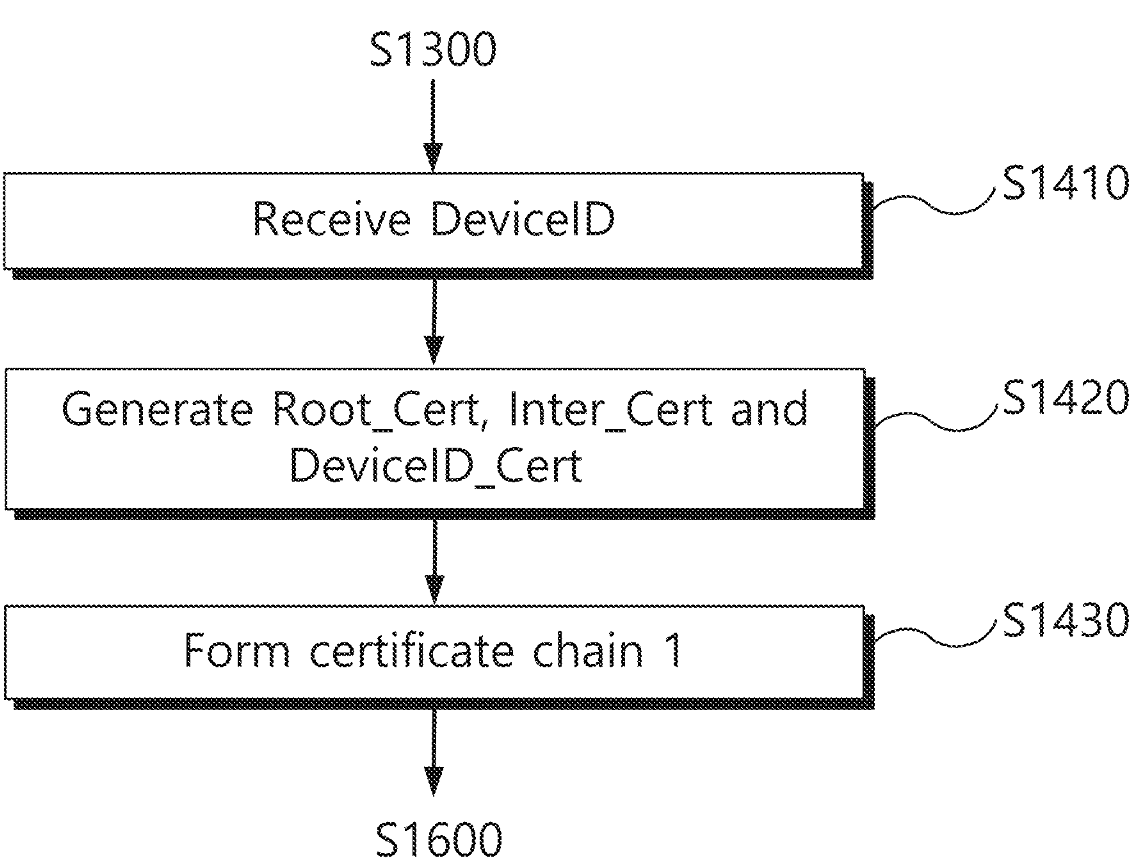
FIG. 5 is a flowchart illustrating an example of an operation of the certification server of FIG. 4, according to some embodiments.

FIG. 5 is a flowchart illustrating an example of an operation of the certification server 1100 of FIG. 4, according to some embodiments. For example, the operation of the certification server 1100 of FIG. 4 may correspond to operation S1400 of FIG. 3. For convenience of explanation, it is assumed in FIG. 5 that a three-layer certificate chain is formed.

In operation S1410, the unique asymmetric key DeviceID may be received. For example, the certification server 1100 may receive the unique asymmetric key DeviceID from the firmware layer 1230 of the electronic device 1200.

In operation S1420, at least one certificate may be generated. For example, the certification server 1100 may generate the unique asymmetric key certificate DeviceID_Cert corresponding to the received unique asymmetric key DeviceID. The certification server 1100 may additionally generate the root certificate Root_Cert and the intermediate certificate Inter_Cert.

In operation S1430, the certificate chain including the root certificate Root_Cert, the intermediate certificate Inter_Cert, and the unique asymmetric key certificate DeviceID_Cert may be formed. For example, the certification server 1100 may form the first certificate chain including the root certificate Root_Cert, the intermediate certificate Inter_Cert, and the unique asymmetric key certificate DeviceID_Cert based on the signing operation.

As described above, the certification server 1100 of the identifier generation system 1000 according to some embodiments may generate the unique asymmetric key certificate DeviceID_Cert and form the first certificate chain. Accordingly, the electronic device 1200 may verify the first certificate chain by using the public key of the unique asymmetric key DeviceID. Through such a verification process, it may be determined whether the first certificate chain is able to be injected into the electronic device 1200.

Figure 6:
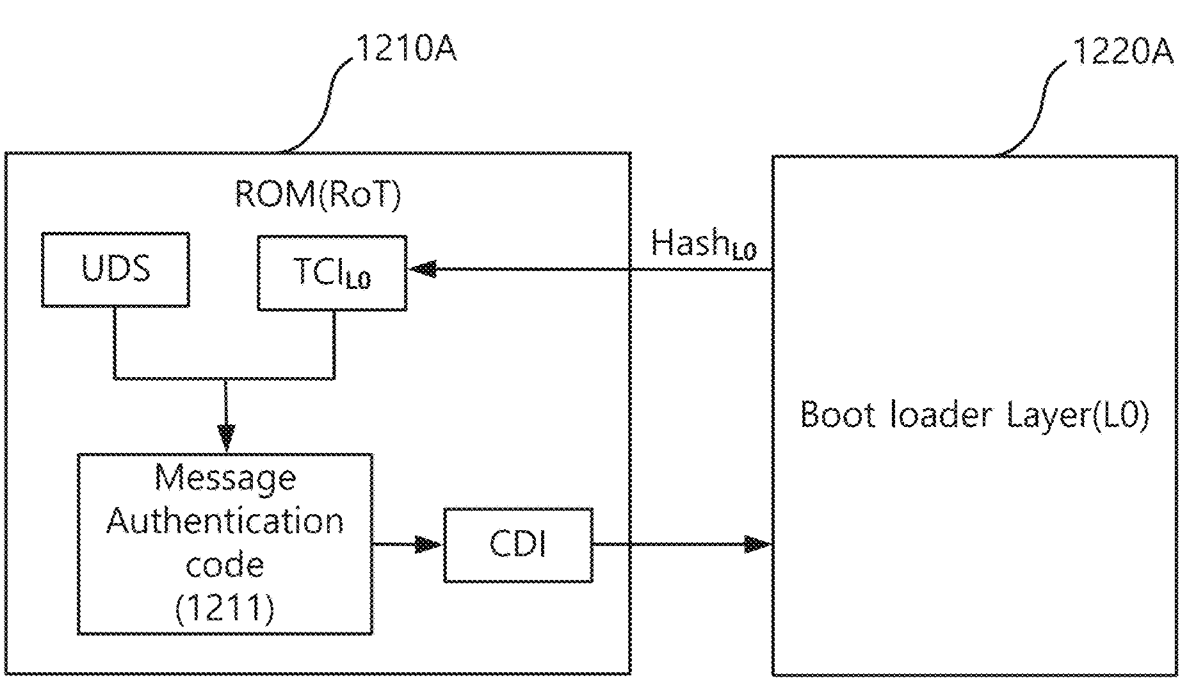
FIG. 6 is a diagram illustrating an example of a ROM of an electronic device of the identifier generation system of FIG. 1, according to some embodiments.

FIG. 6 is a diagram illustrating an example of the ROM 1210 of the electronic device 1200 of FIG. 1, according to some embodiments.

Referring to FIG. 6, the ROM 1210 may apply the secret value UDS and a 0-th layer identifier $TCI_{L0}$, which are unique information of the electronic device 1200, to the message authentication code 1211. The ROM 1210 may generate the unique identifier CDI by using the message authentication code 1211.

The message authentication code 1211 is a code added to data to verify whether the data is modulated (modified, deleted, inserted, or the like). For example, in some embodiments, the message authentication code 1211 used in a ROM 1210A may be a hash based message authentication code HMAC using a one-way hash function. However, this is an example, and embodiments are not limited thereto. For example, in some embodiments, instead of the HMAC, a universal hashing based message authentication code (UMAC) algorithm, a cipher-based message authentication code (CMAC) algorithm, a block cipher-based message authentication code (VMAC) algorithm, or a similar algorithm may be used.

In an embodiment, the ROM 1210A may perform a composition operation, such as, for example, an HMAC operation, by using the secret value UDS. The ROM 1210A may generate the unique identifier CDI by applying the HMAC to the secret value UDS. For example, the ROM 1210A may input the secret value UDS and the 0-th layer identifier TCIL0 into the HMAC. Accordingly, the ROM 1210A may generate the unique identifier CDI that is the operation result of the HMAC.

The secret value UDS, which is unique information possessed by the electronic device 1200, may be a fixed value. That is, the secret value UDS may be a value generated based on unique internal information of the electronic device 1200. For example, even when the bootloader or firmware of the electronic device 1200 is updated or hacked, the secret value UDS is immutable and may always be the same.

The 0-th layer identifier $TCI_{L0}$ may be generated based on the hash value $Hash_{L0}$ of the boot loader layer 1220. For example, the ROM 1210A may receive the hash value $Hash_{L0}$ from a boot loader layer 1220A, that is, the 0-th layer, and generate the unique identifier CDI based on the hash value $Hash_{L0}$. For example, each layer identifier may be one or more of a firmware, an environment setting, a vendor name, product information, a version, a security version number (SVN), and an instance identifier.

The ROM 1210A may transmit the unique identifier CDI to the boot loader layer 1220A. The unique identifier CDI may be used to generate a plurality of asymmetric keys in the boot loader layer 1220A.

Figure 7:
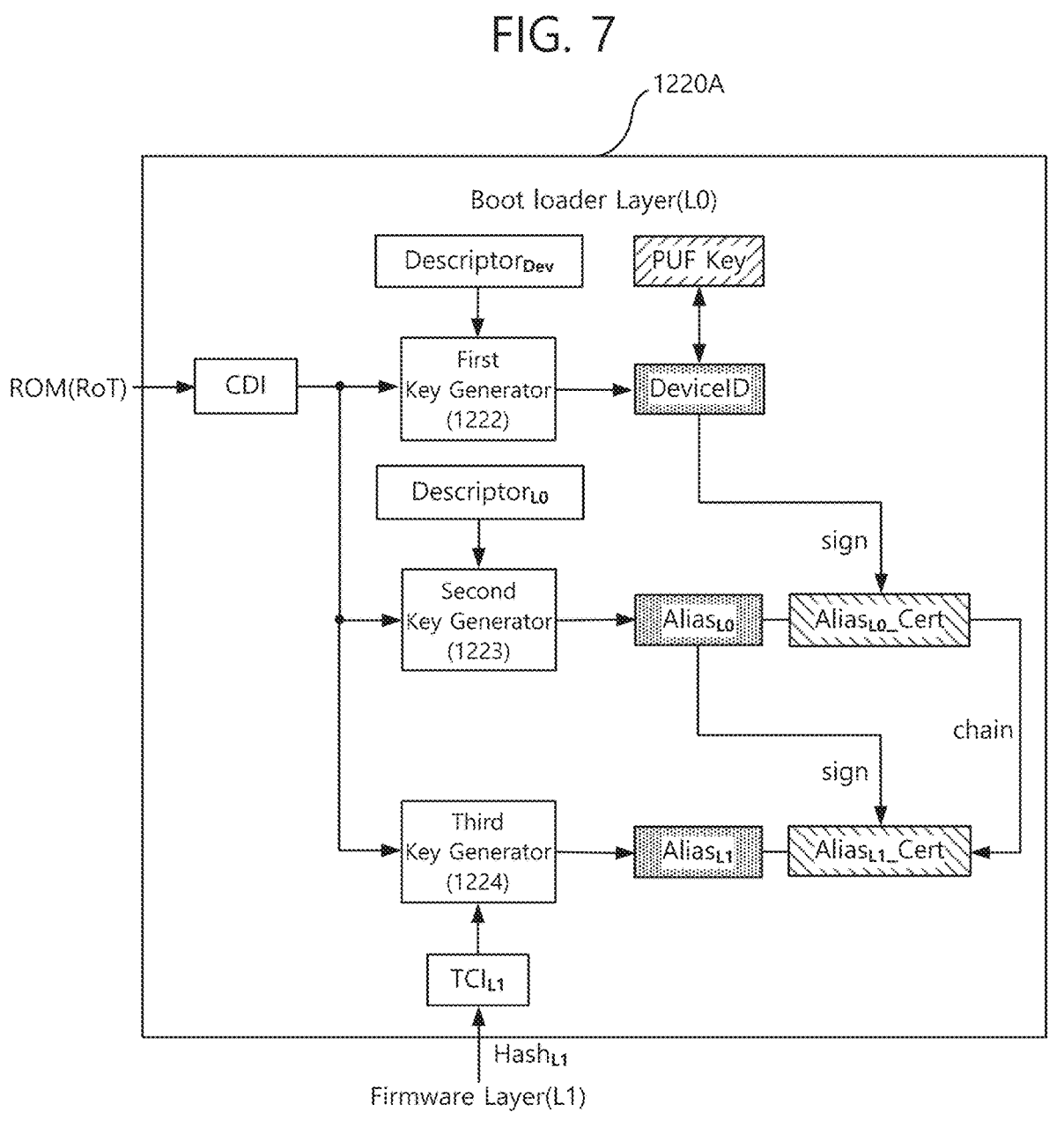

FIG. 7 is a diagram illustrating an example of the boot loader layer 1220 of the electronic device 1200 of FIG. 1, according to some embodiments.

Referring to FIG. 7, the boot loader layer 1220A may generate a plurality of asymmetric keys based on the unique identifier CDI received from the ROM 1210A. For example, the boot loader layer 1220A may generate the unique asymmetric key DeviceID and the 0-th and first variable asymmetric keys $Alias_{L0}$ and $Alias_{L1}$.

The boot loader layer 1220A may generate asymmetric key certificates corresponding to the plurality of asymmetric keys. For example, the boot loader layer 1220A may generate 0-th and first variable asymmetric key certificates $Alias_{L0}$_Cert and $Alias_{L1}$_Cert corresponding respectively to the 0-th and first variable asymmetric keys $Alias_{L0}$ and $Alias_{L1}$.

In an embodiment, the plurality of asymmetric keys generated by the boot loader layer 1220A may be an identifier asymmetric key pair that complies with the DICE standard, and the asymmetric key certificate corresponding to the plurality of asymmetric keys may be an identifier certificate that complies with the DICE standard. However, this is illustrative and embodiments are not limited thereto. In some embodiments, the plurality of asymmetric keys DeviceID, $Alias_{L0}$, and $Alias_{L1}$ generated by the boot loader layer 1220A may be in a form of a symmetric key.

In an embodiment, the boot loader layer 1220A may generate the plurality of asymmetric keys DeviceID, $Alias_{L0}$, and $Alias_{L1}$ by using an elliptic curve cryptosystem (ECC) scheme. For example, the boot loader layer 1220A may generate a pair of a public key and a private key by using the ECC scheme. The public key may be generated by encrypted information of the private key. However, this is an example, and embodiments are not limited thereto.

Describing in more detail the boot loader layer 1220A with reference to FIG. 7, the boot loader layer 1220A may generate the unique asymmetric key DeviceID and the 0-th variable asymmetric key $Alias_{L0}$ based on the unique identifier CDI. For example, the boot loader layer 1220A may combine the unique identifier CDI and a first descriptor value $Descriptor_{DEV}$. In this case, the first descriptor value $Descriptor_{DEV}$ may be a descriptor value for unique information of the electronic device 1200. The boot loader layer 1220A may input a combination of the unique identifier CDI and the first descriptor value $Descriptor_{DEV}$ to a first key generator 1222. Accordingly, the boot loader layer 1220A may generate the unique asymmetric key DeviceID through the first key generator 1222 and store the unique asymmetric key DeviceID. For example, the boot loader layer 1220 may store the unique asymmetric key certificate DeviceID_Cert including a public key in clear text.

In order to safely store the unique asymmetric key DeviceID, the boot loader layer 1220A may encrypt the unique asymmetric key DeviceID with a physically unclonable function (PUF) key. For example, the boot loader layer 1220A may encrypt the secret key of the unique asymmetric key DeviceID with the PUF key. The public key of the unique asymmetric key DeviceID may be formed by the secret key encrypted with the PUF key. Through such an encryption process, the boot loader layer 1220A may prevent the risk of hacking of the immutable unique asymmetric key DeviceID. Even when the electronic device 1200 is updated, the stored unique asymmetric key DeviceID may be unchanged. Thereafter, the boot loader layer 1220A may transmit the unique asymmetric key DeviceID encrypted with the PUF key to the firmware layer 1230.

In this case, the PUF key is an example of one piece of the unique information described above, and may be a security key generated using a difference in the microstructure of a semiconductor produced in the same manufacturing process. The microstructure of nanoscale semiconductors may be generated randomly and autonomously without external random number input (e.g., a random number generator (RNG)). Because the microstructure of a semiconductor is unique like a human fingerprint, the microstructure of a semiconductor is also called a semiconductor chip fingerprint. Therefore, it may be impossible to copy the PUF key due to the characteristics of the semiconductor microstructure randomly generated.

The boot loader layer 1220A may generate the 0-th variable asymmetric key $Alias_{L0}$ based on the unique identifier CDI. For example, the boot loader layer 1220A may combine the unique identifier CDI and a second descriptor value $Descriptor_{L0}$. In this case, the second descriptor value $Descriptor_{L0}$ may be a descriptor value for the boot loader layer 1220A. The boot loader layer 1220A may input a combination of the unique identifier CDI and the second descriptor value $Descriptor_{L0}$ to a second key generator 1223. Then, the boot loader layer 1220A may generate the 0-th variable asymmetric key $Alias_{L0}$ through the second key generator 1223.

The 0-th variable asymmetric key $Alias_{L0}$ may vary according to a change in the 0-th layer L0. For example, when a change such as a boot loader update occurs in the boot loader layer 1220, which is the 0-th layer L0, the 0-th variable asymmetric key $Alias_{L0}$ may change.

The boot loader layer 1220A may generate the first variable asymmetric key $Alias_{L1}$ based on a first layer identifier $TCI_{L1}$ and the unique identifier CDI. For example, the boot loader layer 1220A may combine the unique identifier CDI and the first layer identifier $TCI_{L1}$. In this case, the first layer identifier $TCI_{L1}$ may be generated based on a hash value $Hash_{L1}$ of the firmware layer 1230. The boot loader layer 1220A may receive the hash value $Hash_{L1}$ from the firmware layer 1230, that is, the first layer, and generate the first layer identifier $TCI_{L1}$. The boot loader layer 1220A may input a combination of the unique identifier CDI and the first layer identifier $TCI_{L1}$ to a third key generator 1224. Then, the boot loader layer 1220A may generate the first variable asymmetric key $Alias_{L1}$ through the third key generator 1224.

The first variable asymmetric key $\text{Alias}_{L1}$ may vary due to changes in the first layer L1. For example, when a change such as a firmware update occurs in the firmware layer 1230, which is the first layer L1, the first variable asymmetric key $\text{Alias}_{L1}$ may be changed.

According to a method of generating a plurality of asymmetric keys of the present disclosure, the unique asymmetric key DeviceID may be a unique and immutable key. For example, even when the electronic device 1200 is updated, the asymmetric key DeviceID may be immutable because the asymmetric key DeviceID is encrypted and stored. To the contrary, the 0-th variable asymmetric key $\text{Alias}_{L0}$ and the first variable asymmetric key $\text{Alias}_{L1}$ may be keys that vary according to changes in the electronic device 1200. For example, when the boot loader or firmware is updated, the corresponding change is applied to the 0-th variable asymmetric key $\text{Alias}_{L0}$ and the first variable asymmetric key $\text{Alias}_{L1}$, and accordingly the 0-th variable asymmetric key $\text{Alias}_{L0}$ and the first variable asymmetric key $\text{Alias}_{L1}$ may be variable.

Continuing to refer to FIG. 7, the boot loader layer 1220A may generate the 0-th and first variable asymmetric key certificates $\text{Alias}_{L0}$_Cert and $\text{Alias}_{L1}$_Cert corresponding to the 0-th variable asymmetric key $\text{Alias}_{L0}$ and the first variable asymmetric key $\text{Alias}_{L1}$.

The 0-th variable asymmetric key certificate $\text{Alias}_{L0}$_Cert may include information on the boot loader layer 1220A, which is the 0-th layer, and the public key of the 0-th variable asymmetric key $\text{Alias}_{L0}$. The first variable asymmetric key certificate $\text{Alias}_{L1}$_Cert may include information on the firmware layer 1230, which is the first layer, and the public key of the first variable asymmetric key $\text{Alias}_{L1}$.

The boot loader layer 1220A may sign the 0-th variable asymmetric key certificate $\text{Alias}_{L0}$_Cert with the secret key of the unique asymmetric key DeviceID. The boot loader layer 1220A may sign the first variable asymmetric key certificate $\text{Alias}_{L1}$_Cert with the secret key of the 0-th variable asymmetric key $\text{Alias}_{L0}$. Through such a signing operation, the boot loader layer 1220A may form a chain of the 0-th variable asymmetric key certificate $\text{Alias}_{L0}$_Cert and the first variable asymmetric key certificate $\text{Alias}_{L1}$_Cert.

In some embodiments, the unique asymmetric key certificate DeviceID_Cert, the 0-th variable asymmetric key certificate $\text{Alias}_{L0}$_Cert, and the first variable asymmetric key certificate $\text{Alias}_{L1}$_Cert may be leaf certificates. In some embodiments, at least one of the unique asymmetric key certificate DeviceID_Cert, the 0-th variable asymmetric key certificate $\text{Alias}_{L0}$_Cert, and the first variable asymmetric key certificate $\text{Alias}_{L1}$_Cert may be a leaf certificate.

As described above, the unique asymmetric key DeviceID of the boot loader layer 1220A according to some embodiments may be encrypted with a PUF key and stored. Therefore, the immutable unique asymmetric key DeviceID of the electronic device 1200 may be safely stored. On the other hand, when the boot loader or firmware of the electronic device 1200 is updated, the update information is applied to each layer, and the 0-th variable asymmetric key $\text{Alias}_{L0}$ and the first variable asymmetric key $\text{Alias}_{L1}$ may be changed. Accordingly, changes in each layer due to updates, and the like may be identified.

As described above, the identifier generation system 1000 according to some embodiments may include an asymmetric key that remains unchanged even when the boot loader or firmware is updated. Accordingly, the identifier generation system according to some embodiments may satisfy security standard protocols such as SPDM, and as a result, the reliability of authority authentication of the electronic device 1200 may be further improved.

In FIG. 7, the first to third key generators 1222, 1223 and 1224 are described as being provided separately. However, this is an example, and in some embodiments, the first to third key generators 1222, 1223 and 1224 may be implemented with a single piece of hardware and/or program code.

Figure 8:
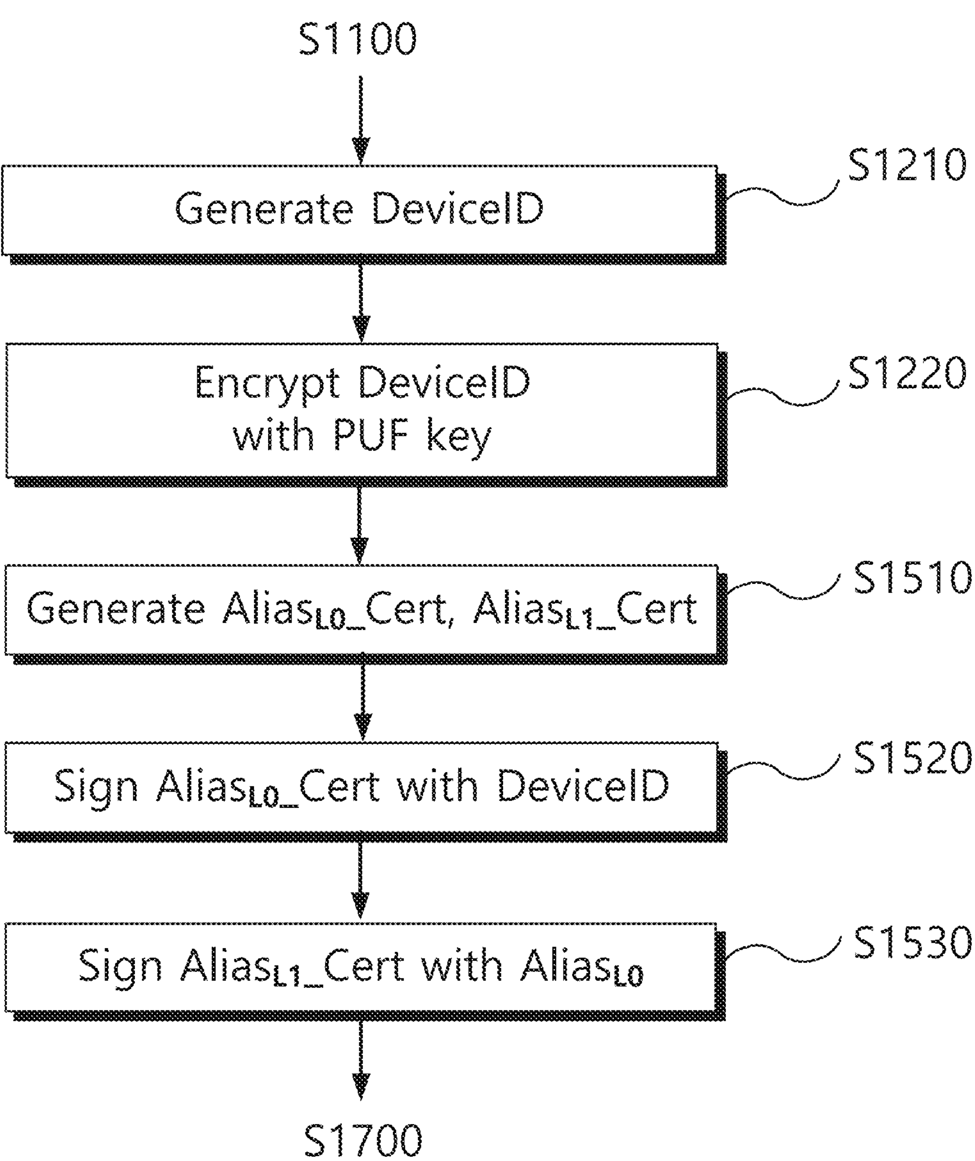
FIG. 8 is a flowchart illustrating an example of an operation of the boot loader layer of FIG. 7, according to some embodiments.

FIG. 8 is a flowchart illustrating an example of an operation of the boot loader layer 1220 of FIG. 7, according to some embodiments. For example, the operation of the boot loader layer in FIG. 8 may correspond to operations S1200 and S1500 in FIG. 3. For convenience of explanation, in FIG. 8, it is assumed that the boot loader layer generates three asymmetric keys.

In operation S1210, the unique asymmetric key DeviceID may be generated based on the unique identifier CDI. For example, the unique asymmetric key DeviceID may be generated based on the unique identifier CDI received from the ROM 1210A. In addition, the boot loader layer 1220A may store the unique asymmetric key DeviceID. The boot loader layer 1220A may input the unique identifier CDI and the descriptor value $\text{Descriptor}_{DEV}$ to the first key generator 1222. Then boot loader layer 1220A may generate the unique asymmetric key DeviceID through the first key generator 1222.

In operation S1220, the unique asymmetric key DeviceID may be encrypted with the PUF key. For example, the boot loader layer 1220A may encrypt the secret key of the unique asymmetric key DeviceID with the PUF key. By encrypting the secret key of the unique asymmetric key DeviceID with the PUF key, the boot loader layer 1220A may prevent a security risk such as hacking of the unique asymmetric key DeviceID. That is, because the unique asymmetric key DeviceID is not changed and is thus immutable, security may be strengthened. The boot loader layer 1220A may strengthen the security of the unique asymmetric key DeviceID by encrypting the unique asymmetric key DeviceID with a PUF key.

In operation S1510, the 0-th asymmetric key certificate $\text{Alias}_{L0}$_Cert and the first asymmetric key certificate $\text{Alias}_{L1}$_Cert may be generated. For example, the boot loader layer 1220A may generate the 0-th variable asymmetric key certificate $\text{Alias}_{L0}$_Cert corresponding to the 0-th variable asymmetric key $\text{Alias}_{L0}$, and generate the first variable asymmetric key certificate $\text{Alias}_{L1}$_Cert corresponding to the first variable asymmetric key $\text{Alias}_{L1}$.

In operation S1520, the 0-th variable asymmetric key certificate $\text{Alias}_{L0}$_Cert may be signed with the unique asymmetric key DeviceID. For example, the boot loader layer 1220A may sign the 0-th variable asymmetric key certificate $\text{Alias}_{L0}$_Cert with the secret key of the unique asymmetric key DeviceID.

In operation S1530, the first variable asymmetric key certificate $\text{Alias}_{L1}$_Cert may be signed with the 0-th variable asymmetric key $\text{Alias}_{L1}$. For example, the boot loader layer 1220A may sign the first variable asymmetric key certificate AliasL1_Cert with the secret key of the 0-th variable asymmetric key $\text{Alias}_{L0}$. Through such a signing operation, the boot loader layer 1220A may form a chain of the 0-th variable asymmetric key certificate AliasL0_Cert and the first variable asymmetric key certificate AliasL1_Cert.

As discussed above, the electronic device 1200 according to some embodiments may store the unique asymmetric key DeviceID and encrypt it with the PUF key. Therefore, the unique asymmetric key DeviceID may be immutable, and security may be strengthened through encryption.

To the contrary, when the boot loader or firmware of the electronic device 1200 is updated, the 0-th variable asymmetric key AliasL0 and the first variable asymmetric key $Alias_{L1}$ may be changed by applying the update information.

Accordingly, the identifier generation system 1000 according to some embodiments may support the DICE standard and simultaneously satisfy security protocols such as SPDM.

Figure 9:
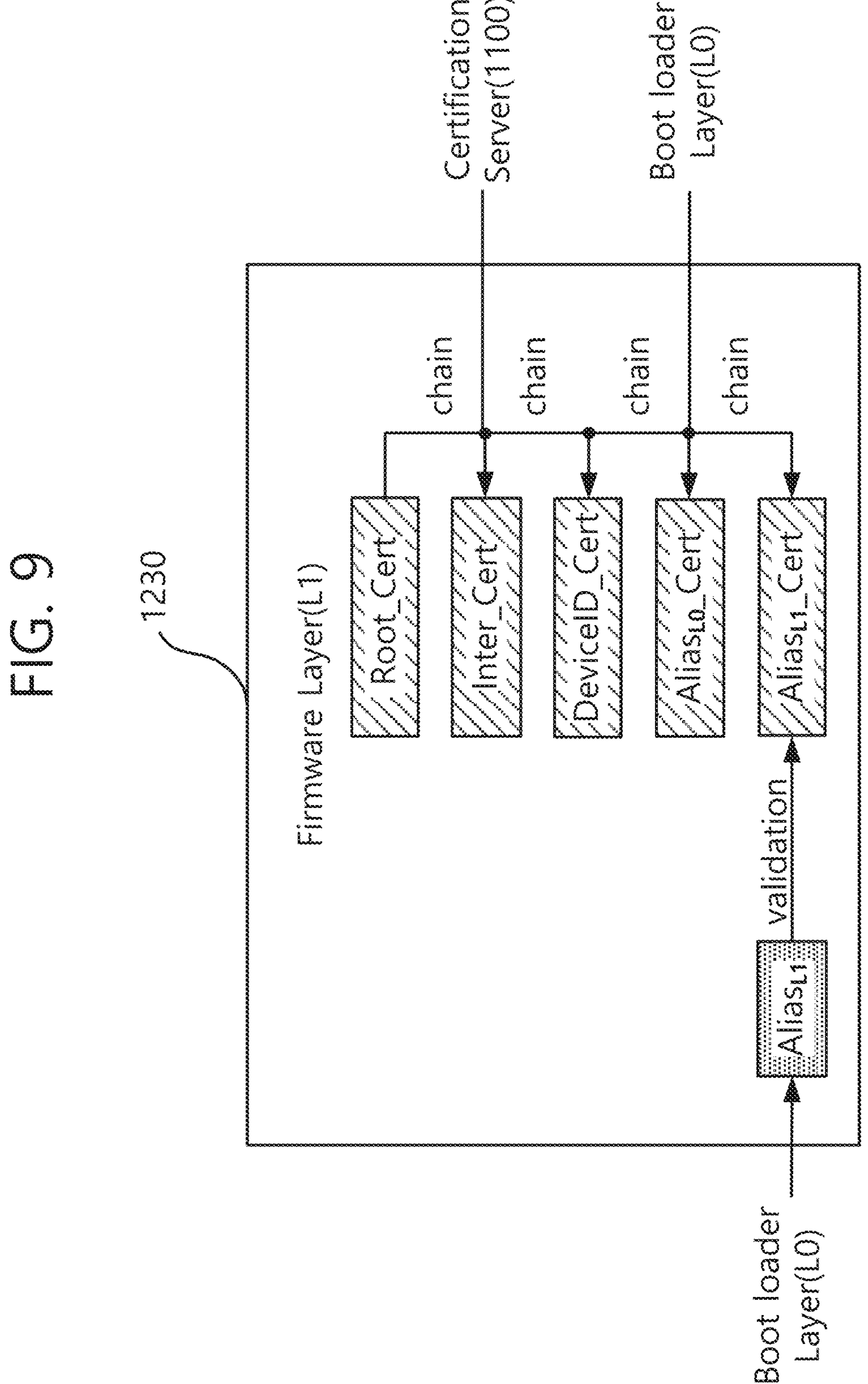
FIG. 9 is a diagram illustrating an example of a firmware layer of the electronic device of the identifier generation system of FIG. 1, according to some embodiments.

FIG. 9 is a diagram illustrating an example of the firmware layer 1230 of the electronic device 1200 of FIG. 1, according to some embodiments.

Referring to FIG. 9, the firmware layer 1230 may receive the first variable asymmetric key $Alias_{L1}$, the 0-th variable asymmetric key certificate $Alias_{L0}$_Cert, and the first variable asymmetric key certificate $Alias_{L1}$_Cert from the boot loader layer 1220. The firmware layer 1230 may receive the first certificate chain from the certification server 1100. Accordingly, the firmware layer 1230 may form the second certificate chain including the root certificate Root_Cert, the intermediate certificate Inter_Cert, the unique asymmetric key certificate DeviceID_Cert, the 0-th variable asymmetric key certificate $Alias_{L0}$_Cert, and the first variable asymmetric key certificate $Alias_{L1}$_Cert. For example, the firmware layer 1230 may store the first certificate chain and store the 0-th and first variable asymmetric key certificates that have been signed. Because the above-mentioned certificates are certificates in which a chain is formed through signatures, the firmware layer 1230 may automatically form the second certificate chain by storing them.

The firmware layer 1230 may verify the second certificate chain by using the received first variable asymmetric key $Alias_{L1}$. For example, the firmware layer 1230 may sign the first asymmetric key certificate $Alias_{L1}$_Cert of the second certificate chain with the secret key of the first variable asymmetric key $Alias_{L1}$. The signature may be verified with the public key of the first variable asymmetric key $Alias_{L1}$ included in the first asymmetric key certificate $Alias_{L1}$_Cert.

When the host terminal requests authority authentication from the electronic device 1200, the firmware layer 1230 may verify the authority of the host terminal based on the stored second certificate chain. For example, the electronic device 1200 may verify the authority of the host terminal in response to the request from the host terminal. The firmware layer 1230 may verify authority for the certificate of the host terminal based on the stored second certificate chain. The electronic device 1200 may determine whether the certificate transmitted by the host terminal matches the second certificate chain, and when matching, the electronic device 1200 may grant authority to the host terminal.

FIG. 9 illustrates the second certificate chain that includes the root certificate Root_Cert, the intermediate certificate Inter_Cert, the unique asymmetric key certificate DeviceID_Cert, the 0-th variable asymmetric key certificate $Alias_{L0}$_Cert, and the first variable asymmetric key certificate $Alias_{L1}$_Cert. However, this is an example, and embodiments are not limited thereto.

According to an embodiment, the second certificate chain may be implemented to include the unique asymmetric key certificate DeviceID_Cert, the 0-th variable asymmetric key certificate $Alias_{L0}$_Cert, and the first variable asymmetric key certificate $Alias_{L1}$_Cert. In this case, the firmware layer 1230 may receive the first certificate chain including the unique asymmetric key certificate DeviceID_Cert, the root certificate Root_Cert, and the intermediate certificate Inter_Cert from the certification server 1100. The firmware layer 1230 may receive the second certificate chain including the unique asymmetric key certificate DeviceID_Cert, the 0-th asymmetric key certificate $Alias_{L0}$_Cert, and the first asymmetric key certificate $Alias_{L1}$_Cert from the boot loader layer 1220. In this case, similarly to those described above, the firmware layer 1230 may perform verification operations on the first and second certificate chains.

In some embodiments, when the unique asymmetric key certificate DeviceID_Cert is received from the certification server 1100, the certificate chain including the unique asymmetric key certificate DeviceID_Cert, the 0-th asymmetric key certificate $Alias_{L0}$_Cert, and the first asymmetric key certificate $Alias_{L1}$_Cert may be formed.

Figure 10:
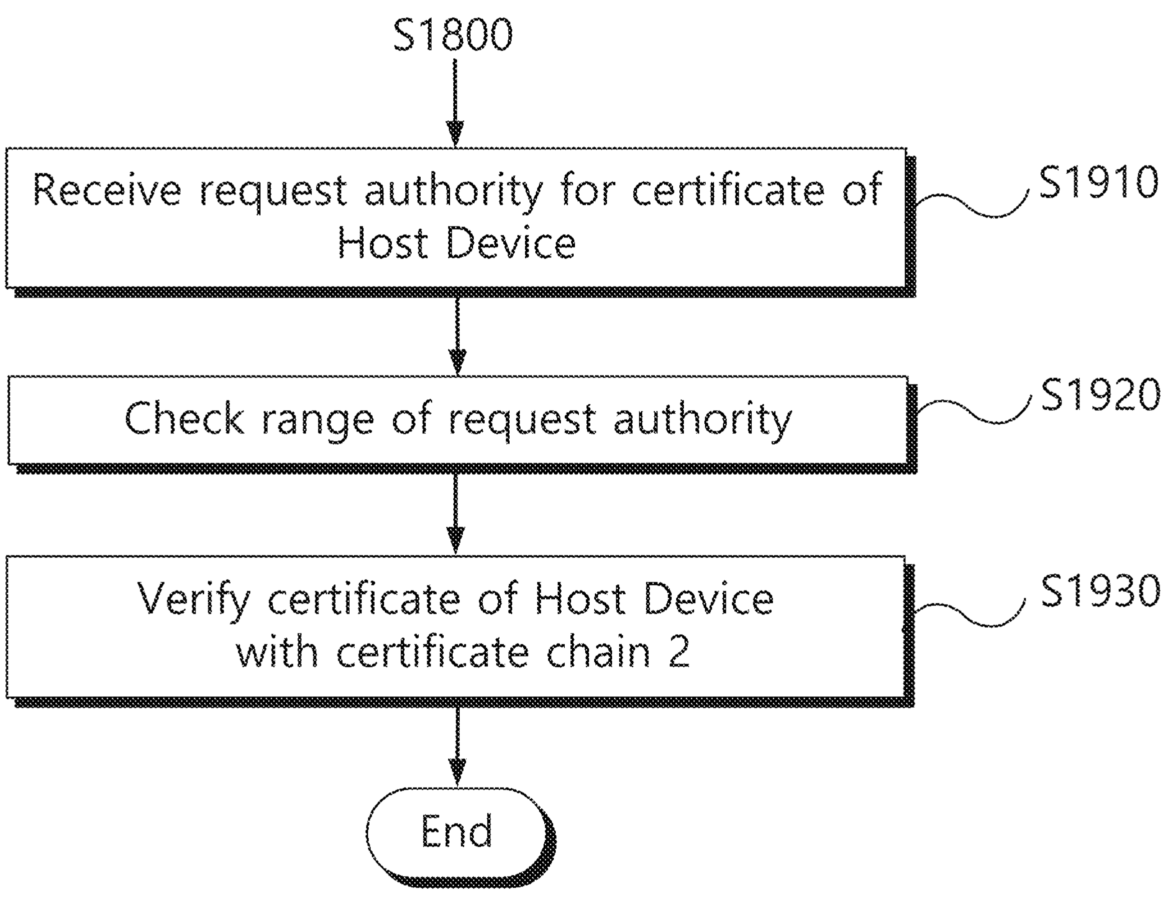
FIG. 10 is a flowchart illustrating an example of an operation of the firmware layer of FIG. 9, according to some embodiments

FIG. 10 is a flowchart illustrating an example of the firmware layer 1230 of the electronic device 1200 of FIG. 9, according to some embodiments. For convenience of explanation, it is assumed that the second certificate chain includes the root certificate Root_Cert, the intermediate certificate Inter_Cert, the unique asymmetric key certificate DeviceID_Cert, the 0-th variable asymmetric key certificate $Alias_{L0}$_Cert, and the first variable asymmetric key certificate $Alias_{L1}$_Cert.

In operation S1910, the authority authentication of the host terminal 1300 may be requested. For example, the firmware layer 1230 may receive an authorization request for a certificate of the host terminal 1300 from the host terminal 1300.

In operation S1920, the scope of authority authentication may be confirmed. For example, the firmware layer 1230 may check the scope of authority authentication of the host terminal 1300. The scope of authority authentication may be determined based on the second certificate chain. For example, in some embodiments, the host terminal 1300 may request authority authentication of the electronic device 1200 together with the root certificate Root_Cert. In some embodiments, the host terminal 1300 may request authority authorization of the electronic device 1200 together with the 0-th variable asymmetric key certificate $Alias_{L0}$_Cert or the first variable asymmetric key certificate $Alias_{L1}$_Cert. In this case, the scope of authority authentication may be expanded to not only the manufacturer of the electronic device 1200 but also whether the electronic device 1200 has been updated.

In operation S1930, the authority of the host terminal 1300 may be verified based on the second certificate chain. For example, when the host terminal 1300 requests authority authorization of the electronic device 1200 with the root certificate Root_Cert, the firmware layer 1230 may verify only the first certificate chain including the root certificate Root_Cert. In other words, the firmware layer 1230 may verify only the first certificate chain among the second certificate chains.

When the host terminal 1300 requests authority authentication of the electronic device 1200 together with the 0-th variable asymmetric key certificate $Alias_{L0}$_Cert or the first variable asymmetric key certificate $Alias_{L1}$_Cert, in operation S1930, the firmware layer 1230 may verify the second certificate chain including the 0-th variable asymmetric key certificate $Alias_{L0}$_Cert or the first variable asymmetric key certificate $Alias_{L1}$_Cert.

As described above, the electronic device 1200 according to the present disclosure may verify the authority of the host terminal 1300. By using the 0-th variable asymmetric key $Alias_{L0}$ and the first variable asymmetric key $Alias_{L1}$, the electronic device 1200 may determine whether the boot loader or firmware is updated. By using the unique asymmetric key DeviceID, the electronic device 1200 may satisfy a security standard protocol such as SPDM. The reliability of authority authentication of the host terminal 1300 based on the asymmetric key described above may be improved.

It may be understood that the above description is illustrative and that embodiments are not limited thereto. For example, embodiments may be applied and utilized in various manners.

Figure 11:
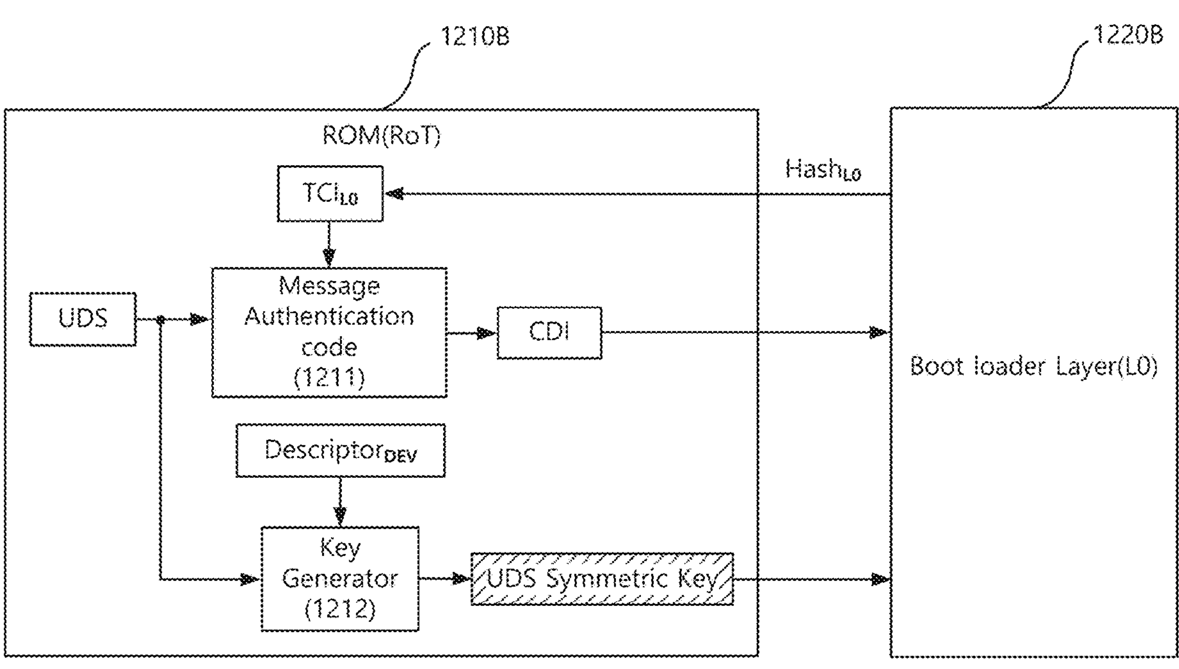
FIG. 11 is a diagram illustrating an example of the ROM of FIG. 6, according to some embodiments.
Figure 12:
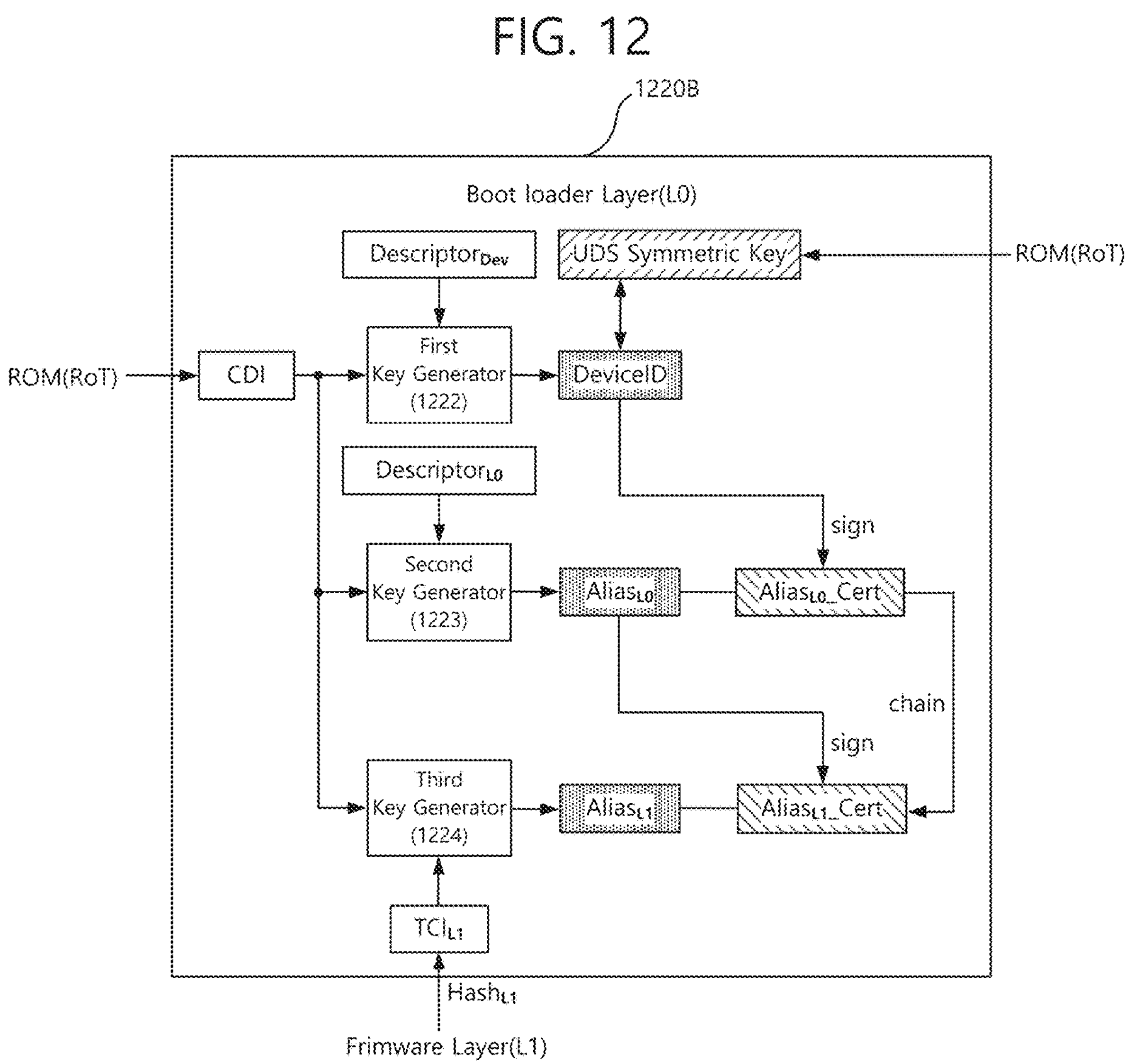
FIG. 12 is a diagram illustrating an example of the boot loader layer of FIG. 7, according to some embodiments.

FIG. 11 is a diagram illustrating an example of the ROM 1210 of FIG. 1, according to some embodiments. FIG. 12 is a diagram illustrating an example of the boot loader layer 1220 of FIG. 1, according to some embodiments. FIGS. 11 and 12 are similar to the ROM 1210A of FIG. 6 and the boot loader layer 1220A of FIG. 7. Accordingly, similar or identical components are denoted by similar or identical reference numerals, and overlapping descriptions will be omitted below for conciseness.

Referring to FIG. 11, a ROM 1210B may apply the unique secret value UDS and the 0-th layer identifier $TCI_{L0}$ of the electronic device 1200 to the message authentication code 1211. In some embodiments, the ROM 1210B may generate the unique identifier CDI by applying HMAC to the secret value UDS.

The secret value UDS may be unique information possessed by the electronic device 1200 and may be a fixed value. That is, the secret value UDS may be a value generated based on unique internal information of the electronic device 1200. For example, even when the bootloader or firmware of the electronic device 1200 is updated or hacked, the secret value UDS is immutable and may always be the same.

The 0-th layer identifier $TCI_{L0}$ may be generated based on the hash value $Hash_{L0}$ of a boot loader layer 1220B.

In order to generate a plurality of asymmetric keys, the ROM 1210 may transmit the unique identifier CDI to the boot loader layer 1220B.

The ROM 1210B may generate a UDS symmetric key based on the secret value UDS. The ROM 1210B may generate the UDS symmetric key to encrypt the immutable unique asymmetric key DeviceID. For example, the ROM 1210B may combine the secret value UDS and the descriptor value $Descriptor_{DEV}$. In this case, the descriptor value $Descriptor_{DEV}$ may be a descriptor value for unique information of the electronic device 1200. The ROM 1210B may input the secret value UDS and the descriptor value $Descriptor_{DEV}$ to a key generator 1212. The ROM 1210B may generate the UDS symmetric key through the key generator 1212.

The ROM 1210B may transmit the UDS symmetric key to the boot loader layer 1220B to encrypt the unique asymmetric key DeviceID.

When the PUF key cannot be generated or injected during mass production of the electronic device 1200, the ROM 1210B may generate a UDS symmetric key instead of the PUF key. The electronic device 1200 may encrypt the unique asymmetric key DeviceID with the UDS symmetric key.

The UDS symmetric key may be unique to the electronic device 1200 and may be a symmetric key generated based on the secret value UDS, which is a fixed value. Therefore, the UDS symmetric key may have unique characteristics similar to the PUF key.

Referring to FIG. 12, the boot loader layer 1220B may generate a plurality of asymmetric keys based on the unique identifier CDI received from the ROM 1210B. The boot loader layer 1220B may generate asymmetric key certificates corresponding to the plurality of asymmetric keys.

The boot loader layer 1220B may generate the unique asymmetric key DeviceID and the 0-th variable asymmetric key $Alias_{L0}$ based on the unique identifier CDI. The scheme of generating the unique asymmetric key DeviceID and the 0-th variable asymmetric key $Alias_{L0}$ is similar to the embodiment described in FIG. 7.

The boot loader layer 1220B may generate the first variable asymmetric key $Alias_{L1}$ based on the first layer identifier $TCI_{L1}$ and the unique identifier CDI. The scheme of generating the first variable asymmetric key $Alias_{L1}$ is similar to the embodiment described in FIG. 7.

When the PUF key cannot be generated or injected during mass production of the electronic device 1200, the boot loader layer 1220B may encrypt the unique asymmetric key DeviceID with the received UDS symmetric key. The UDS symmetric key may be a symmetric key where the public key and private key are the same. For example, the boot loader layer 1220B may encrypt the secret key of the unique asymmetric key DeviceID with the UDS symmetric key. The public key of the unique asymmetric key DeviceID may be formed by the secret key encrypted with the UDS symmetric key. The boot loader layer 1220A may transmit the unique asymmetric key DeviceID encrypted with the UDS symmetric key to the firmware layer 1230.

The boot loader layer 1220B may safely store the unique asymmetric key DeviceID by encrypting the unique asymmetric key DeviceID with the UDS symmetric key, which is unique information. Through such an encryption process, the boot loader layer 1220A may prevent the risk of hacking of the immutable unique asymmetric key DeviceID. Even when the electronic device 1200 is updated, the stored unique asymmetric key DeviceID may remain unchanged.

The boot loader layer 1220B may generate the variable asymmetric key certificates $Alias_{L0}$_Cert and $Alias_{L1}$_Cert. The scheme of generating the asymmetric key certificates $Alias_{L0}$_Cert and $Alias_{L1}$_Cert is similar to the embodiment described in FIG. 7.

As described above, the electronic device 1200 according to some embodiments may encrypt the unique asymmetric key DeviceID with the immutable UDS symmetric key. Therefore, it is possible to prevent the risk of hacking of the immutable unique asymmetric key DeviceID of the electronic device 1200.

Figure 13:
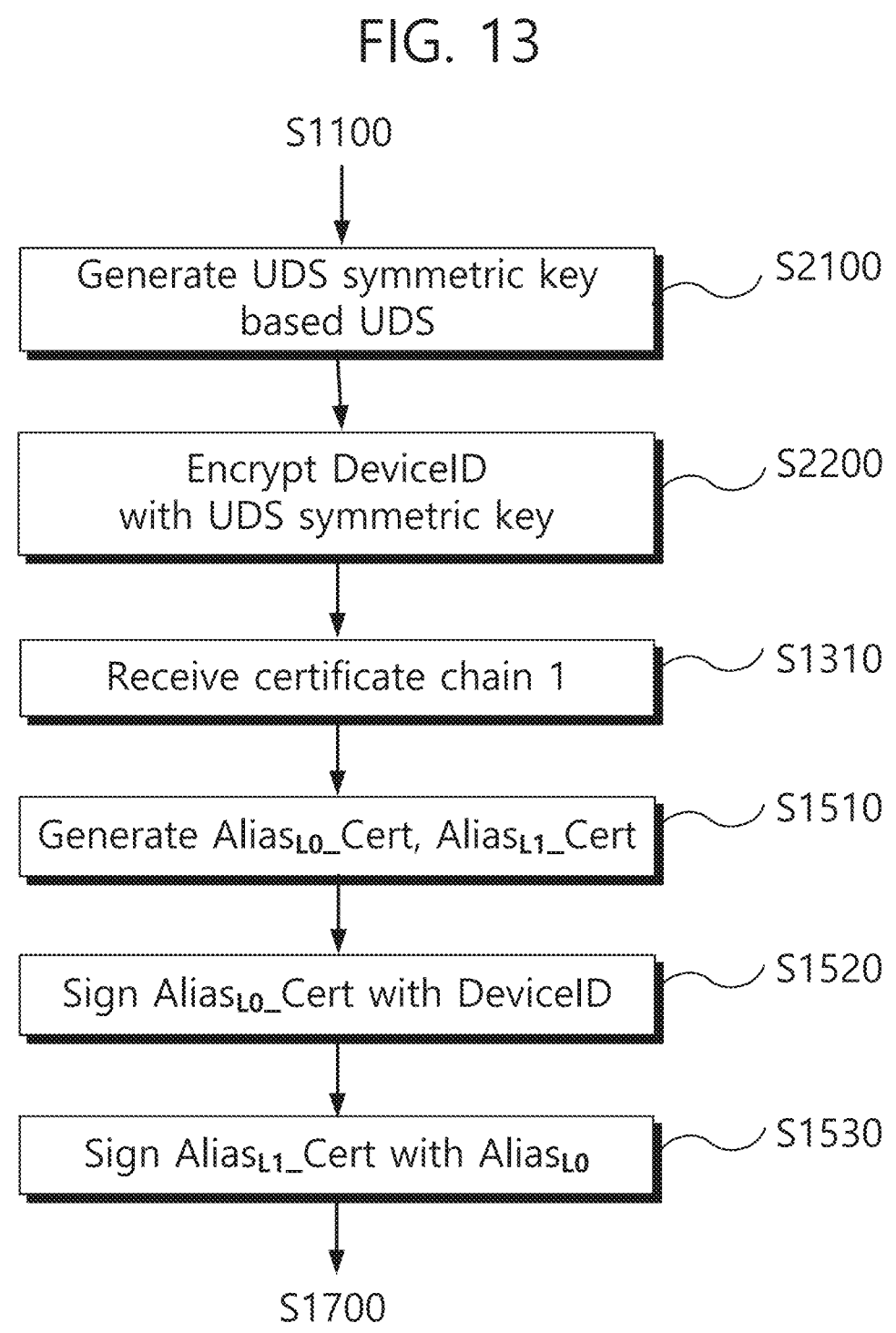

FIG. 13 is a flowchart illustrating an example of an operation of the boot loader layer 1220B of FIG. 12, according to some embodiments. The operation of the boot loader layer 1220B in FIG. 12 is similar to that of the boot loader layer in FIG. 8. Accordingly, similar or identical operations are denoted by similar or identical reference numerals, and overlapping descriptions will be omitted hereinafter for conciseness.

In operation S2100, the UDS symmetric key may be generated based on the secret value UDS. The ROM 1210B may generate the UDS symmetric key to generate the immutable unique asymmetric key DeviceID. The UDS symmetric key may be unique to the electronic device 1200 and may be a symmetric key generated based on the secret value UDS, which is a fixed value. Therefore, the UDS symmetric key may have immutable characteristics similar to the PUF key.

In operation S2200, the unique asymmetric key DeviceID may be encrypted with the UDS symmetric key. For example, when the PUF key cannot be generated or injected during mass production of the electronic device 1200, the boot loader layer 1220B may encrypt the unique asymmetric key DeviceID with the received UDS symmetric key.

In operation S1310, the first certificate chain certificate chain 1 may be received.

In operation S1510, the 0-th asymmetric key certificate $Alias_{L0}$_Cert and the first asymmetric key certificate $Alias_{L1}$_Cert may be generated.

In operation S1520, the 0-th variable asymmetric key certificate $Alias_{L0}$_Cert may be signed with the unique asymmetric key DeviceID.

In operation S1530, the first variable asymmetric key certificate $Alias_{L1}$_Cert may be signed with the 0-th variable asymmetric key $Alias_{L0}$.

As described above, the electronic device 1200 according to some embodiments may safely store the unique asymmetric key DeviceID by encrypting the unique asymmetric key DeviceID with the UDS symmetric key, which is unique information. Through such an encryption process, the boot loader layer 1220A may prevent the risk of hacking of the immutable unique asymmetric key DeviceID. Even when the electronic device 1200 is updated, the stored unique asymmetric key DeviceID may remain unchanged.

Figure 14:
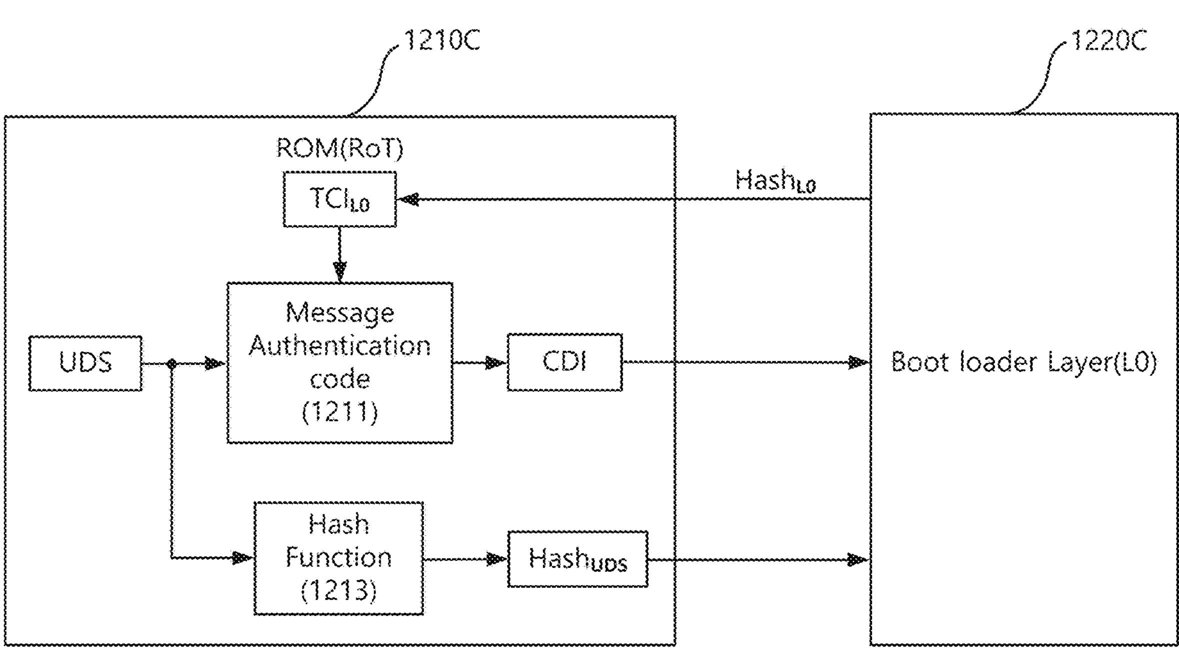
FIG. 14 is a diagram illustrating an example of the ROM of FIG. 6, according to some embodiments.
Figure 15:
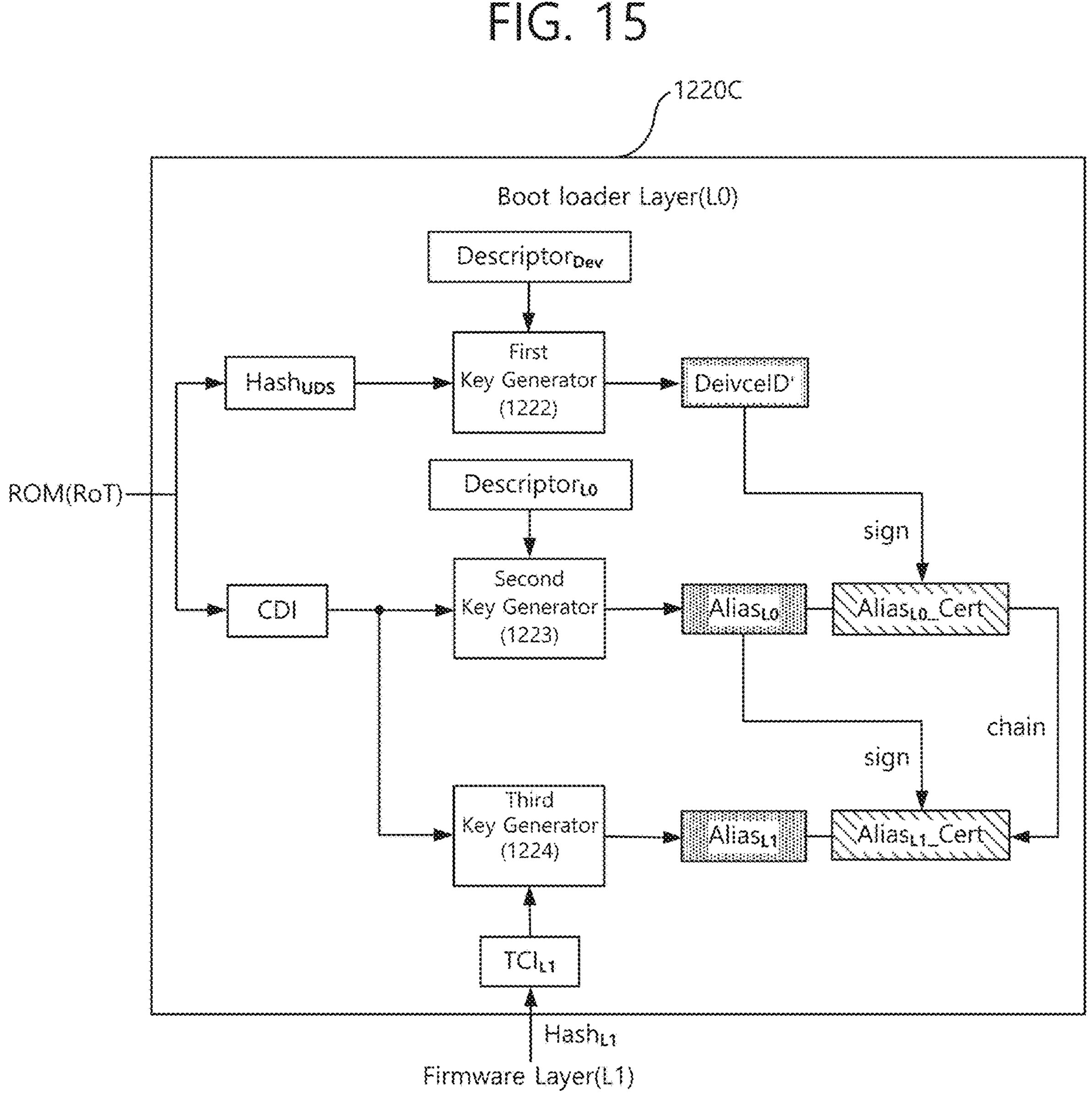
FIG. 15 is a diagram illustrating an example of the boot loader layer of FIG. 7, according to some embodiments.

FIG. 14 is a diagram illustrating an example of the ROM 1210 of FIG. 6, according to some embodiments. FIG. 15 is a diagram illustrating an example of the boot loader layer 1220 of FIG. 7, according to some embodiments. FIGS. 14 and 15 are similar to the ROM 1210A of FIG. 6 and the boot loader layer 1220A of FIG. 7. Accordingly, similar or identical components are denoted by similar or identical reference numerals, and overlapping descriptions will be omitted below for conciseness.

Referring to FIG. 14, a ROM 1210C may generate a secret hash value $Hash_{UDS}$ by inputting the secret value UDS into a hash function 1213. For example, the ROM 1210C may process the secret value UDS through the formula of the hash function 1213. The result value operated by the hash function 1213 may be referred to as the secret hash value $Hash_{UDS}$. In this case, the hash function 1213 may be a hash algorithm or a hash function algorithm, and may be a function that maps data of an arbitrary length to data of a fixed length.

The secret value UDS may be a value generated based on unique internal information of the electronic device 1200. The secret hash value $Hash_{UDS}$ generated based on the secret value UDS may also be a value generated based on unique information.

The ROM 1210C may generate the unique identifier CDI by inputting the secret value UDS and the 0-th layer identifier $TCI_{L0}$ into the message authentication code 1211. The scheme of generating the unique identifier CDI is similar to the embodiment described in FIG. 6.

The ROM 1210C may transmit the secret hash value $Hash_{UDS}$ and the unique identifier CDI to a boot loader layer 1220C.

Referring to FIG. 15, the boot loader layer 1220C may generate a unique asymmetric key DeviceID' based on the secret hash value $Hash_{UDS}$. For example, the boot loader layer 1220C may combine the secret hash value $Hash_{UDS}$ and the first descriptor value $Descriptor_{DEV}$. In this case, the first descriptor value $Descriptor_{DEV}$ may be a descriptor value for unique information of the electronic device 1200. The boot loader layer 1220C may input the combination of the secret hash value $Hash_{UDS}$ and the first descriptor value $Descriptor_{DEV}$ to the first key generator 1222. Then, the boot loader layer 1220C may generate the variable unique asymmetric key DeviceID' through the first key generator 1222. Because the boot loader layer 1220C generates the unique asymmetric key DeviceID' based only on the secret hash value $Hash_{UDS}$, which is unique information, the unique asymmetric key DeviceID' may not be stored. Accordingly, the boot loader layer 1220C may not encrypt the variable unique asymmetric key DeviceID'. That is, the unique asymmetric key DeviceID' may change each time the electronic device 1200 is updated or booted.

The boot loader layer 1220C may generate the 0-th variable asymmetric key $Alias_{L0}$ based on the unique identifier CDI. The boot loader layer 1220C may generate the first variable asymmetric key $Alias_{L1}$ based on the first layer identifier $TCI_{L1}$ and the unique identifier CDI. The scheme of generating the 0-th variable asymmetric key $Alias_{L0}$ and the first variable asymmetric key $Alias_{L1}$ is similar to the embodiment described in FIG. 7.

The identifier generation system 1000 according to some embodiments may generate a plurality of asymmetric keys, and the plurality of asymmetric keys may include the unique asymmetric key DeviceID and at least one variable asymmetric key. Because at least one variable asymmetric key is included, the identifier generation system 1000 according to some embodiments may determine whether the boot loader or firmware is updated.

As described above, the identifier generation system 1000 according to some embodiments may support the DICE standard and may include a unique asymmetric key that is an identifier of the electronic device 1200 that remains unchanged even when the boot loader or firmware is updated. In some embodiments, the identifier generation system 1000 may include a unique asymmetric key generated based on the unique value of the electronic device 1200 even when variable. Accordingly, the identifier generation system 1000 according to some embodiments may satisfy security standard protocols such as SPDM and provide improved reliability of authority authentication.

Various embodiments have been described above. The present disclosure may include not only the above-described embodiments, but also simple design changes or easily changeable embodiments. The present disclosure may include techniques that can easily modify and implement the embodiments. Therefore, the scope of the present disclosure should not be limited to the above-described embodiments, but should be defined by the claims described below as well as the claims and equivalents.

What is claimed is:

1. An identifier generation system comprising:

a certification server configured to generate a certificate; and an electronic device configured to receive the certificate from the certification server, wherein the electronic device includes:

a read-only memory (ROM) configured to apply a secret value and a 0-th layer identifier to a message authentication code to generate a unique identifier;

a boot loader layer configured to generate a plurality of asymmetric keys and to generate an asymmetric key certificate corresponding to the plurality of asymmetric keys; and a firmware layer configured to store the asymmetric key certificate and to transmit and receive the plurality of asymmetric keys, wherein the plurality of asymmetric keys generated by the boot loader layer includes:

at least one unique asymmetric key that is immutable when the electronic device is updated; and at least one variable asymmetric key that varies when the electronic device is updated, and wherein the certification server is configured to:

receive the at least one unique asymmetric key; and form a first certificate chain including a root certificate, an intermediate certificate, and a unique asymmetric key certificate, the unique asymmetric key certificate being based on the at least one unique asymmetric key.

2. The identifier generation system of claim 1, wherein the ROM, the boot loader layer, and the firmware layer are based on a device identifier composition engine (DICE) standard.

3. The identifier generation system of claim 1, wherein the boot loader layer is configured to generate the at least one unique asymmetric key based on the unique identifier, and encrypt and store the plurality of asymmetric keys.

4. The identifier generation system of claim 3, wherein the boot loader layer is configured to encrypt the at least one unique asymmetric key with a physical unclonable function (PUF) key based on a semiconductor microstructure of the electronic device.

5. The identifier generation system of claim 3, wherein the ROM is configured to generate an unique device secret UDS symmetric key based on the secret value, and wherein the boot loader layer is configured to encrypt the at least one unique asymmetric key with the UDS symmetric key.

6. The identifier generation system of claim 1, wherein the ROM is configured to generate a secret hash value by inputting the secret value into a hash function and receiving the secret hash value as an output from the hash function, and wherein the boot loader layer is configured to generate a variable unique asymmetric key based on the secret hash value.

7. The identifier generation system of claim 1, wherein the boot loader layer is configured to:

generate a 0-th variable asymmetric key based on the unique identifier;

generate a first variable asymmetric key based on a first layer identifier and the unique identifier;

generate the 0-th layer identifier based on a hash value of the boot loader layer; and generate the first layer identifier based on a hash value of the firmware layer.

8. The identifier generation system of claim 7, wherein the boot loader layer is configured to:

generate a 0-th variable asymmetric key certificate corresponding to the 0-th variable asymmetric key and generate a first variable asymmetric key certificate corresponding to the first variable asymmetric key; and sign the 0-th variable asymmetric key certificate with the at least one unique asymmetric key and sign the first variable asymmetric key certificate with the 0-th variable asymmetric key.

9. The identifier generation system of claim 8, wherein the firmware layer is configured to:

receive the first certificate chain;

receive the signed 0-th variable asymmetric key certificate and the signed first variable asymmetric key certificate; and store a second certificate chain including the first certificate chain, the 0-th variable asymmetric key certificate, and the first variable asymmetric key certificate that are received.

10. An electronic device for generating an identifier, the electronic device comprising:

a ROM configured to apply a secret value and a 0-th layer identifier to a message authentication code to generate a unique identifier;

a boot loader layer configured to generate a plurality of asymmetric keys and to generate an asymmetric key certificate corresponding to the plurality of asymmetric keys; and a firmware layer configured to store the asymmetric key certificate and to transmit and receive the plurality of asymmetric keys, wherein the plurality of asymmetric keys generated by the boot loader layer includes:

at least one unique asymmetric key that is immutable when the electronic device is updated; and at least one variable asymmetric key that varies when the electronic device is updated, wherein the ROM is configured to generate a secret hash value by inputting the secret value into a hash function and receiving the secret hash value as an output from the hash function, and wherein the boot loader layer is configured to generate a variable unique asymmetric key based on the secret hash value.

11. The electronic device of claim 10, wherein the boot loader layer is configured to generate the at least one unique asymmetric key, and encrypt and store the plurality of asymmetric keys.

12. The electronic device of claim 11, wherein the boot loader layer is configured to encrypt the at least one unique asymmetric key with a physical unclonable function (PUF) key based on a semiconductor microstructure of the electronic device.

13. The electronic device of claim 11, wherein the ROM is configured to generate an unique device secret UDS symmetric key based on the secret value, and wherein the boot loader layer is configured to encrypt the at least one unique asymmetric key with the UDS symmetric key.

14. The electronic device of claim 10, wherein the boot loader layer is configured to:

generate a 0-th variable asymmetric key based on the unique identifier;

generate a first variable asymmetric key based on a first layer identifier and the unique identifier;

generate the 0-th layer identifier based on a hash value of the boot loader layer; and generate the first layer identifier based on a hash value of the firmware layer.

15. A method of generating an identifier, the method comprising:

generating a unique identifier by applying a secret value and a 0-th layer identifier to a message authentication code;

generating a plurality of asymmetric keys based on the unique identifier;

generating an asymmetric key certificate corresponding to the plurality of asymmetric keys;

storing the asymmetric key certificate; and authenticating authority of the asymmetric key certificate, wherein the plurality of asymmetric keys includes:

at least one unique asymmetric key that is immutable upon an update of an electronic device; and at least one variable asymmetric key that varies upon the update of the electronic device, wherein the generating of the plurality of asymmetric keys includes:

generating the at least one unique asymmetric key based on the secret value and the unique identifier;

generating a 0-th variable asymmetric key based on the unique identifier; and generating a first variable asymmetric key based on a first layer identifier and the unique identifier, wherein the 0-th layer identifier is generated based on a hash value of a boot loader layer, and wherein the first layer identifier is generated based on a hash value of a firmware layer.

16. The method of claim 15, further comprising:

injecting a unique asymmetric key certificate from a certification server into the electronic device, wherein the injecting of the unique asymmetric key certificate includes:

forming, by the certification server, a first certificate chain by generating a root certificate, an intermediate certificate, and the unique asymmetric key certificate; and injecting the first certificate chain from the certification server into the electronic device.

17. The method of claim 15, wherein the generating of the plurality of asymmetric keys further includes:

generating a secret hash value by inputting the secret value into a hash function and receiving the secret hash value as an output from the hash function; and generating a variable unique asymmetric key based on the secret hash value.

* * * * *